(12) United States Patent
Palla-Venkata et al.

(10) Patent No.: US 11,518,927 B2
(45) Date of Patent: *Dec. 6, 2022

(54) DEMULSIFIER COMPOSITIONS FOR TREATMENT OF SUBTERRANEAN FORMATIONS AND PRODUCED OIL

(71) Applicant: Halliburton Energy Services, Inc., Houston, TX (US)

(72) Inventors: Chandra Sekhar Palla-Venkata, Conroe, TX (US); Jeremy A. Holtsclaw, Kingwood, TX (US); Antonio Recio, III, Humble, TX (US); Kristina Henkel Holan, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/303,638

(22) Filed: Jun. 3, 2021

(65) Prior Publication Data

US 2021/0284898 A1 Sep. 16, 2021

Related U.S. Application Data

(62) Division of application No. 15/774,252, filed as application No. PCT/US2015/064210 on Dec. 7, 2015, now Pat. No. 11,053,429.

(51) Int. Cl.
*C09K 8/60* (2006.01)
*C09K 8/62* (2006.01)
*C09K 8/70* (2006.01)

(52) U.S. Cl.
CPC ............. *C09K 8/602* (2013.01); *C09K 8/62* (2013.01); *C09K 8/70* (2013.01)

(58) Field of Classification Search
CPC . C09K 8/26; C09K 8/28; C09K 8/602; C09K 8/62; Y10S 507/938
See application file for complete search history.

(56) References Cited

U.S. PATENT DOCUMENTS

| 2011/0223125 A1* | 9/2011 | Hough | C11D 3/3765 |
| | | | 507/224 |
| 2013/0261227 A1* | 10/2013 | Nguyen | C10G 31/08 |
| | | | 523/403 |

* cited by examiner

*Primary Examiner* — Aiqun Li
(74) *Attorney, Agent, or Firm* — K&L Gates LLP

(57) ABSTRACT

Various embodiments disclosed relate to demulsifier compositions for treatment of subterranean formations or produced petroleum comprising an emulsion. In various embodiments, the present invention provides a method of treating a subterranean formation. The method includes placing in the subterranean formation a demulsifier composition. The demulsifier composition includes an alkanolamide surfactant that is a $(C_1\text{-}C_{50})$hydrocarbyl amide having groups $R^1$ and $R^2$ substituted on the amide nitrogen, wherein $R^1$ and $R^2$ are each independently selected from the group consisting of —H, —$(C_1\text{-}C_{50})$hydrocarbyl, and —$(C_1\text{-}C_{50})$hydrocarbylene-OH, wherein at least one of $R^1$ and $R^2$ is —$(C_1\text{-}C_{50})$hydrocarbylene-OH. The demulsifier composition includes an alkoxylated alcohol surfactant that is a $(C_1\text{-}C_{50})$hydrocarbyl-OH having a —$((C_2\text{-}C_3)\text{alkylene-O})_n$—H group on the —OH group, wherein n is about 1 to about 100. The demulsifier composition also includes an amine-oxide surfactant. At each occurrence the $(C_1\text{-}C_{50})$hydrocarbyl and $(C_1\text{-}C_{50})$hydrocarbylene are substituted or unsubstituted and are independently selected.

20 Claims, 8 Drawing Sheets

1 min   5 min   10 min 1 min 200°F　　5 min 200°F　　10 min 200°F 1 min
200°F 5 min
200°F 10 min
200°F 1 min 5 min 10 min

US 11,518,927 B2

DEMULSIFIER COMPOSITIONS FOR TREATMENT OF SUBTERRANEAN FORMATIONS AND PRODUCED OIL

BACKGROUND

Demulsification of oil-in-water or water-in-oil emulsions can be useful during a wide variety of subterranean treatment operations. For example, demulsification is important during hydraulic fracturing operations because the presence of emulsions can increase the viscosity of fracturing fluids or produced fluids, decreasing the effective permeability thereof and thus having a negative impact on the overall production. Emulsions present in produced petroleum fluids can require the use of post-production chemicals to eliminate them, which may not be a preferred solution.

BRIEF DESCRIPTION OF THE FIGURES

The drawings illustrate generally, by way of example, but not by way of limitation, various embodiments discussed in the present document.

DETAILED DESCRIPTION OF THE INVENTION

Figure 1:
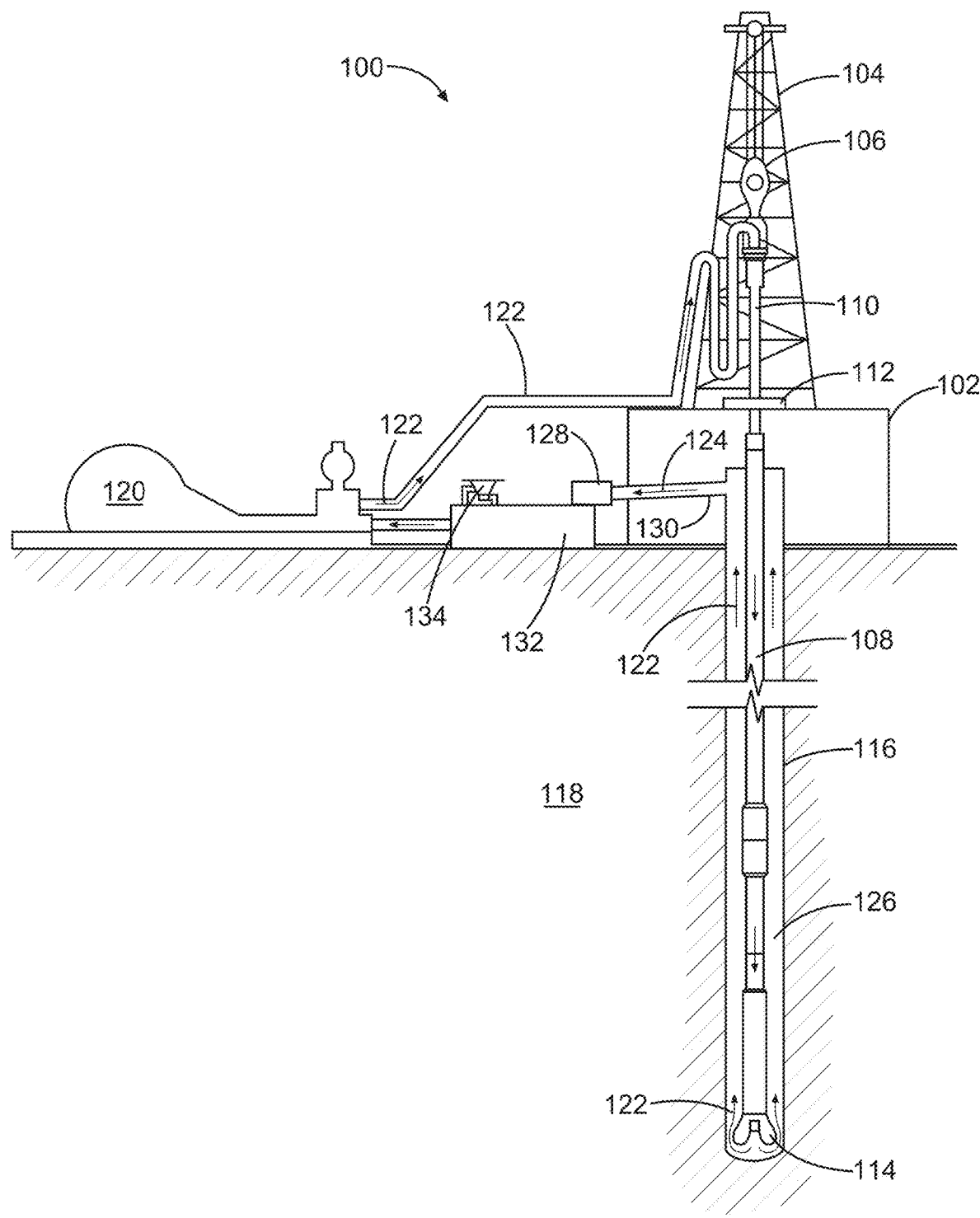
FIG. 1 illustrates a drilling assembly, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

In this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. A comma can be used as a delimiter or digit group separator to the left or right of a decimal mark; for example, "0.000,1" is equivalent to "0.0001."

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

The term "organic group" as used herein refers to any carbon-containing functional group. Examples can include an oxygen-containing group such as an alkoxy group, aryloxy group, aralkyloxy group, oxo(carbonyl) group; a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, C(=NOR)R, and substituted or unsubstituted (C$_1$-C$_{100}$)hydrocarbyl, wherein R can be hydrogen (in examples that include other carbon atoms)

or a carbon-based moiety, and wherein the carbon-based moiety can itself be substituted or unsubstituted.

The term "substituted" as used herein in conjunction with a molecule or an organic group as defined herein refers to the state in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxy amines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O) CH$_2$C(O)R, C(S)R, C(O)OR, OC(O)R, C(O)N(R)$_2$, OC(O) N(R)$_2$, C(S)N(R)$_2$, (CH$_2$)$_{0-2}$N(R)C(O)R, (CH$_2$)$_{0-2}$N(R)N (R)$_2$, N(R)N(R)C(O)R, N(R)N(R)C(O)OR, N(R)N(R)CON (R)$_2$, N(R)SO$_2$R, N(R)SO$_2$N(R)$_2$, N(R)C(O)OR, N(R)C(O) R, N(R)C(S)R, N(R)C(O)N(R)$_2$, N(R)C(S)N(R)$_2$, N(COR) COR, N(OR)R, C(=NH)N(R)$_2$, C(O)N(OR)R, and C(=NOR)R, wherein R can be hydrogen or a carbon-based moiety; for example, R can be hydrogen, (C$_1$-C$_{100}$)hydrocarbyl, alkyl, acyl, cycloalkyl, aryl, aralkyl, heterocyclyl, heteroaryl, or heteroarylalkyl; or wherein two R groups bonded to a nitrogen atom or to adjacent nitrogen atoms can together with the nitrogen atom or atoms form a heterocyclyl.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbon atoms or, in some embodiments, from 2 to 8 carbon atoms. Examples include, but are not limited to, vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "acyl" as used herein refers to a group containing a carbonyl moiety wherein the group is bonded via the carbonyl carbon atom. The carbonyl carbon atom is bonded to a hydrogen forming a "formyl" group or is bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. An acyl group can include 0 to about 12, 0 to about 20, or 0 to about 40 additional carbon atoms bonded to the carbonyl group. An acyl group can include double or triple bonds within the meaning herein. An acryloyl group is an example of an acyl group. An acyl group can also include heteroatoms within the meaning herein. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "aryl" as used herein refers to cyclic aromatic hydrocarbon groups that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, a phenyl group substituted at any one or more of 2-, 3-, 4-, 5-, or 6-positions of the phenyl ring, or a naphthyl group substituted at any one or more of 2- to 8-positions thereof.

The term "heterocyclyl" as used herein refers to aromatic and non-aromatic ring compounds containing three or more ring members, of which one or more is a heteroatom such as, but not limited to, N, O, and S.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include about 1 to about 12, about 1 to about 20, or about 1 to about 40 carbon atoms bonded to the oxygen atom, and can further include double or triple bonds, and can also include heteroatoms. For example, an allyloxy group or a methoxyethoxy group is also an alkoxy group within the meaning herein, as is a methylenedioxy group in a context where two adjacent atoms of a structure are substituted therewith.

The term "amine" as used herein refers to primary, secondary, and tertiary amines having, e.g., the formula N(group)$_3$ wherein each group can independently be H or non-H, such as alkyl, aryl, and the like. Amines include but are not limited to R—NH$_2$, for example, alkylamines, arylamines, alkylarylamines; R$_2$NH wherein each R is independently selected, such as dialkylamines, diarylamines, aralkylamines, heterocyclylamines and the like; and R$_3$N wherein each R is independently selected, such as trialkylamines, dialkylarylamines, alkyldiarylamines, triarylamines, and the like. The term "amine" also includes ammonium ions as used herein.

The term "amino group" as used herein refers to a substituent of the form —NH$_2$, —NHR, —NR$_2$, —NR$_3^+$, wherein each R is independently selected, and protonated forms of each, except for —NR$_3^+$, which cannot be protonated. Accordingly, any compound substituted with an amino group can be viewed as an amine. An "amino group" within the meaning herein can be a primary, secondary, tertiary, or quaternary amino group. An "alkylamino" group includes a monoalkylamino, dialkylamino, and trialkylamino group.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" or "hydrocarbyl" as used herein refers to a molecule or functional group, respectively, that includes carbon and hydrogen atoms. The term can also refer to a molecule or functional group that normally includes both carbon and hydrogen atoms but wherein all the hydrogen atoms are substituted with other functional groups. A hydrocarbyl group can be a functional group derived from a straight chain, branched, or cyclic hydrocarbon, and can be alkyl, alkenyl, alkynyl, aryl, cycloalkyl, acyl, or any combination thereof. Hydrocarbyl groups can be shown as $(C_a-C_b)$hydrocarbyl, wherein a and b are positive integers and mean having any of a to b number of carbon atoms. For example, $(C_1-C_4)$hydrocarbyl means the hydrocarbyl group can be methyl $(C_1)$, ethyl $(C_2)$, propyl $(C_3)$, or butyl $(C_4)$, and $(C_0-C_b)$hydrocarbyl means in certain embodiments there is no hydrocarbyl group.

The term "solvent" as used herein refers to a liquid that can dissolve a solid, liquid, or gas. Non-limiting examples of solvents are silicones, organic compounds, water, alcohols, ionic liquids, and supercritical fluids.

The term "room temperature" as used herein refers to a temperature of about 15° C. to 28° C.

The term "standard temperature and pressure" as used herein refers to 20° C. and 101 kPa.

As used herein, "degree of polymerization" is the number of repeating units in a polymer.

As used herein, the term "polymer" refers to a molecule having at least one repeating unit and can include copolymers.

The term "copolymer" as used herein refers to a polymer that includes at least two different repeating units. A copolymer can include any suitable number of repeating units.

The term "downhole" as used herein refers to under the surface of the earth, such as a location within or fluidly connected to a wellbore.

As used herein, the term "drilling fluid" refers to fluids, slurries, or muds used in drilling operations downhole, such as during the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material, disproportionate permeability modifier, or a relative permeability modifier. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well, and can also be called a "work-over fluid." Remedial treatments, also called work-over treatments, can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material," "disproportionate permeability modifier," or "relative permeability modifier," refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packer fluid" refers to fluids or slurries that can be placed in the annular region of a well between tubing and outer casing above a packer. In various examples, the packer fluid can provide hydrostatic pressure in order to lower differential pressure across the sealing element, lower differential pressure on the wellbore and casing to prevent collapse, and protect metals and elastomers from corrosion.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

In various embodiments, salts having a positively charged counterion can include any suitable positively charged counterion. For example, the counterion can be ammonium ($NH_4^+$), or an alkali metal such as sodium ($Na^+$), potassium ($K^+$), or lithium ($Li^+$). In some embodiments, the counterion can have a positive charge greater than +1, which can in some embodiments complex to multiple ionized groups, such as $Zn^{2+}$, $Al^{3+}$, or alkaline earth metals such as $Ca^{2+}$ or $Mg^{2+}$.

In various embodiments, salts having a negatively charged counterion can include any suitable negatively charged counterion. For example, the counterion can be a halide, such as fluoride, chloride, iodide, or bromide. In other examples, the counterion can be nitrate, hydrogen sulfate, dihydrogen phosphate, bicarbonate, nitrite, perchlorate, iodate, chlorate, bromate, chlorite, hypochlorite, hypobromite, cyanide, amide, cyanate, hydroxide, permanganate. The counterion can be a conjugate base of any carboxylic acid, such as acetate or formate. In some embodiments, a counterion can have a negative charge greater than −1, which can in some embodiments complex to multiple ionized groups, such as oxide, sulfide, nitride, arsenate, phosphate, arsenite, hydrogen phosphate, sulfate, thiosulfate, sulfite, carbonate, chromate, dichromate, peroxide, or oxalate.

In various embodiments, the present invention provides a method of treating a subterranean formation. The method includes placing in the subterranean formation a demulsifier composition. The demulsifier composition includes an alkanolamide surfactant that is a ($C_1$-$C_{50}$)hydrocarbyl amide having groups $R^1$ and $R^2$ substituted on the amide nitrogen, wherein $R^1$ and $R^2$ are each independently selected from the group consisting of —H, —($C_1$-$C_{50}$)hydrocarbyl, and —($C_1$-$C_{50}$)hydrocarbylene-OH, wherein at least one of $R^1$ and $R^2$ is —($C_1$-$C_{50}$)hydrocarbylene-OH. The demulsifier composition includes an alkoxylated alcohol surfactant that is a ($C_1$-$C_{50}$)hydrocarbyl-OH having a —(($C_2$-$C_3$)alkylene-O)$_n$—H group on the —OH group, wherein n is about 1 to about 100. The demulsifier composition also includes an amine-oxide surfactant. At each occurrence the ($C_1$-$C_{50}$) hydrocarbyl and ($C_1$-$C_{50}$)hydrocarbylene are substituted or unsubstituted and are independently selected.

In various embodiments, the present invention provides a method of treating a subterranean formation. The method includes placing in the subterranean formation a demulsifier composition. The demulsifier composition includes an aqueous phase. The demulsifier composition includes an oil phase, wherein the demulsifier composition includes an emulsion including the aqueous phase and the oil phase. The demulsifier composition includes an alkanolamide surfactant that has the structure:

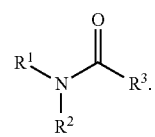

The variable $R^3$ is a substituted or unsubstituted ($C_{12}$-$C_{25}$) hydrocarbyl of a tall oil fatty acid having the structure $R^3$—C(O)—OH. The variables $R^1$ and $R^2$ are each independently —($C_1$-$C_{10}$)alkylene-OH. The demulsifier composition includes an alkoxylated alcohol surfactant that is a ($C_{10}$-$C_{20}$)hydrocarbon including a secondary alcohol group, wherein the ($C_{10}$-$C_{20}$)hydrocarbon is otherwise unsubstituted, wherein the secondary alcohol group includes a —($CH_2$—$CH_2$—O)$_{5-10}$—H group thereon. The demulsifier composition includes an amine-oxide surfactant having the structure:

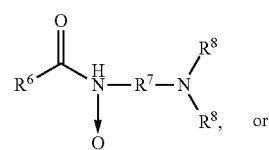

-continued

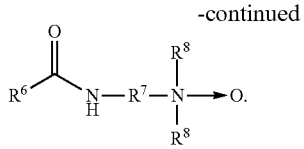

The variable $R^6$ is $(C_{11}-C_{13})$alkyl. The variable $R^7$ is $(C_1-C_5)$alkylene. At each occurrence, $R^8$ is independently $(C_1-C_5)$alkyl.

In various embodiments, the present invention provides a method of treating a subterranean formation. The method includes placing in the subterranean formation a demulsifier composition. The demulsifier composition includes an aqueous phase that is about 10 wt % to about 80 wt % of the demulsifier composition. The demulsifier composition includes an oil phase that is about 10 wt % to about 80 wt % of the demulsifier composition, wherein the demulsifier composition includes an emulsion including the aqueous phase and the oil phase. The demulsifier composition includes a $(C_1-C_5)$alkyl alcohol that is about 5 wt % to about 30 wt % of the demulsifier composition. The demulsifier composition includes an alkanolamide surfactant that is about 5 wt % to about 40 wt % of the demulsifier composition, wherein the alkanolamide surfactant has the structure:

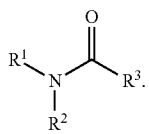

The variable $R^3$ is a substituted or unsubstituted $(C_{15}-C_{17})$ hydrocarbyl of a tall oil fatty acid having the structure $R^3$—C(O)—OH. The variables $R^1$ and $R^2$ are each —$CH_2$—$CH_2$—OH. The demulsifier composition includes an alkoxylated alcohol surfactant that is about 5 wt % to about 40 wt % of the demulsifier composition, wherein the alkoxylated alcohol surfactant is a $(C_{15})$hydrocarbon including a secondary alcohol group, wherein the $(C_{15})$hydrocarbon is otherwise unsubstituted, wherein the secondary alcohol group includes a —($CH_2$—$CH_2$—O$)_7$—H group thereon. The demulsifier composition includes an amine-oxide surfactant that is about 0.01 wt % to about 20 wt % of the demulsifier composition, wherein the amine-oxide surfactant has the structure:

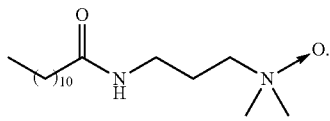

The demulsifier composition includes an amine-oxide surfactant that is about 0.01 wt % to about 20 wt % of the demulsifier composition, wherein the amine-oxide surfactant has the structure:

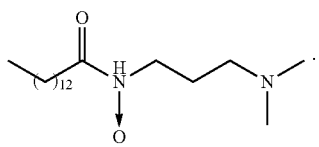

In various embodiments, the present invention provides a method of treating a produced petroleum including an emulsion. The method includes contacting the produced petroleum including the emulsion with a demulsifier composition to reduce or eliminate the emulsion. The demulsifier composition includes an alkanolamide surfactant that is a $(C_1-C_{50})$hydrocarbyl amide having groups $R^1$ and $R^2$ substituted on the amide nitrogen, wherein $R^1$ and $R^2$ are each independently selected from the group consisting of —H, —$(C_1-C_{50})$hydrocarbyl, and —$(C_1-C_{50})$hydrocarbylene-OH, wherein at least one of $R^1$ and $R^2$ is —$(C_1-C_{50})$hydrocarbyl-OH. The demulsifier composition includes an alkoxylated alcohol surfactant that is a $(C_1-C_{50})$hydrocarbyl-OH having a —$((C_2-C_3)$alkylene-O$)_n$—H group on the —OH group, wherein n is about 1 to about 100. The demulsifier composition includes an amine-oxide surfactant. At each occurrence the $(C_1-C_{50})$hydrocarbyl and $(C_1-C_{50})$ hydrocarbylene are substituted or unsubstituted and are independently selected.

In various embodiments, the present invention provides a system including a tubular disposed in a subterranean formation. The system also includes a pump configured to pump a demulsifier composition in the subterranean formation through the tubular. The demulsifier composition includes an alkanolamide surfactant that is a $(C_1-C_{50})$hydrocarbyl amide having groups $R^1$ and $R^2$ substituted on the amide nitrogen, wherein $R^1$ and $R^2$ are each independently selected from the group consisting of —H, —$(C_1-C_{50})$ hydrocarbyl, and —$(C_1-C_{50})$hydrocarbylene-OH, wherein at least one of $R^1$ and $R^2$ is —$(C_1-C_{50})$hydrocarbylene-OH. The demulsifier composition includes an alkoxylated alcohol surfactant that is a $(C_1-C_{50})$hydrocarbyl-OH having a —$((C_2-C_3)$alkylene-O$)_n$—H group on the —OH group, wherein n is about 1 to about 100. The demulsifier composition also includes an amine-oxide surfactant. At each occurrence the $(C_1-C_{50})$hydrocarbyl and $(C_1-C_{50})$hydrocarbylene are substituted or unsubstituted and are independently selected.

In various embodiments, the present invention provides a demulsifier composition. The demulsifier composition includes an alkanolamide surfactant that is a $(C_1-C_{50})$hydrocarbyl amide having groups $R^1$ and $R^2$ substituted on the amide nitrogen, wherein $R^1$ and $R^2$ are each independently selected from the group consisting of —H, —$(C_1-C_{50})$ hydrocarbyl, and —$(C_1-C_{50})$hydrocarbylene-OH, wherein at least one of $R^1$ and $R^2$ is —$(C_1-C_{50})$hydrocarbylene-OH. The demulsifier composition includes an alkoxylated alcohol surfactant that is a $(C_1-C_{50})$hydrocarbyl-OH having a —$((C_2-C_3)$alkylene-O$)_n$—H group on the —OH group, wherein n is about 1 to about 100. The demulsifier composition also includes an amine-oxide surfactant. At each occurrence the $(C_1-C_{50})$hydrocarbyl and $(C_1-C_{50})$hydrocarbylene are substituted or unsubstituted and are independently selected.

In various embodiments, the present invention provides a demulsifier composition. The demulsifier composition includes an aqueous phase. The demulsifier composition includes an oil phase, wherein the demulsifier composition includes an emulsion including the aqueous phase and the oil phase. The demulsifier composition includes an alkanolamide surfactant that has the structure:

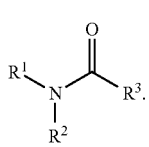

The variable $R^3$ is a substituted or unsubstituted $(C_{12}-C_{25})$ hydrocarbyl of a tall oil fatty acid having the structure $R^3$—C(O)—OH. The variables $R^1$ and $R^2$ are each independently —$(C_1-C_{10})$alkylene-OH. The demulsifier composition includes an alkoxylated alcohol surfactant that is a $(C_{10}-C_{20})$hydrocarbon including a secondary alcohol group, wherein the $(C_{10}-C_{20})$hydrocarbon is otherwise unsubstituted, wherein the secondary alcohol group includes a —$(CH_2—CH_2—O)_{5-10}$—H group thereon. The demulsifier composition includes an amine-oxide surfactant having the structure:

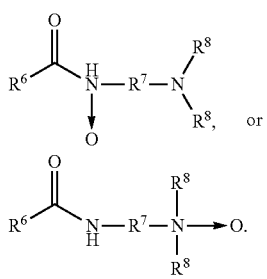

The variable $R^6$ is $(C_{11}-C_{13})$alkyl. The variable $R^7$ is $(C_1-C_5)$alkylene. At each occurrence, $R^8$ is independently $(C_1-C_5)$alkyl.

In various embodiments, the present invention provides a demulsifier composition. The demulsifier composition includes an aqueous phase that is about 10 wt % to about 80 wt % of the demulsifier composition. The demulsifier composition includes an oil phase that is about 10 wt % to about 80 wt % of the demulsifier composition, wherein the demulsifier composition includes an emulsion including the aqueous phase and the oil phase. The demulsifier composition includes a $(C_1-C_5)$alkyl alcohol that is about 5 wt % to about 30 wt % of the demulsifier composition. The demulsifier composition includes an alkanolamide surfactant that is about 5 wt % to about 40 wt % of the demulsifier composition, wherein the alkanolamide surfactant has the structure:

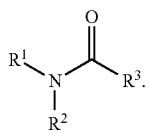

The variable $R^3$ is a substituted or unsubstituted $(C_{15}-C_{17})$ hydrocarbyl of a tall oil fatty acid having the structure $R^3$—C(O)—OH. The variables $R^1$ and $R^2$ are each —$CH_2$—$CH_2$—OH. The demulsifier composition includes an alkoxylated alcohol surfactant that is about 5 wt % to about 40 wt % of the demulsifier composition, wherein the alkoxylated alcohol surfactant is a $(C_{15})$hydrocarbon including a secondary alcohol group, wherein the $(C_{15})$hydrocarbon is otherwise unsubstituted, wherein the secondary alcohol group includes a —$(CH_2—CH_2—O)_7$—H group thereon. The demulsifier composition includes an amine-oxide surfactant that is about 0.01 wt % to about 20 wt % of the demulsifier composition, wherein the amine-oxide surfactant has the structure:

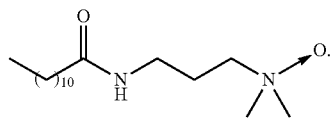

The demulsifier composition includes an amine-oxide surfactant that is about 0.01 wt % to about 20 wt % of the demulsifier composition, wherein the amine-oxide surfactant has the structure:

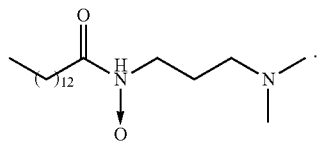

In various embodiments, the present invention provides a method of preparing a demulsifier composition for treatment of a subterranean formation or of produced petroleum including an emulsion. The method includes forming a demulsifier composition. The demulsifier composition includes an alkanolamide surfactant that is a $(C_1-C_{50})$hydrocarbyl amide having groups $R^1$ and $R^2$ substituted on the amide nitrogen, wherein $R^1$ and $R^2$ are each independently selected from the group consisting of —H, —$(C_1-C_{50})$ hydrocarbyl, and —$(C_1-C_{50})$hydrocarbylene-OH, wherein at least one of $R^1$ and $R^2$ is —$(C_1-C_{50})$hydrocarbylene-OH. The demulsifier composition includes an alkoxylated alcohol surfactant that is a $(C_1-C_{50})$hydrocarbyl-OH having a —$((C_2-C_3)$alkylene-O$)_n$—H group on the —OH group, wherein n is about 1 to about 100. The demulsifier composition also includes an amine-oxide surfactant. At each occurrence the $(C_1-C_{50})$hydrocarbyl and $(C_1-C_{50})$hydrocarbylene are substituted or unsubstituted and are independently selected.

In various embodiments, the demulsifier composition has certain advantages over other demulsifier compositions, at least some of which are unexpected. For example, in various embodiments, the demulsifier composition can break an emulsion more rapidly, at lower temperatures, or a combination thereof, as compared to other demulsifier compositions.

In various embodiments, the demulsifier composition can decrease or eliminate emulsions in various subterranean treatment fluids, such as stimulation fluids (e.g., fracturing fluids), thereby providing better demulsification and better permeability of subterranean treatment fluids than other demulsifier compositions. In various embodiments, the demulsifier composition can decrease or eliminate emulsion-induced viscosification of various subterranean treatment fluids, such as stimulation fluids (e.g., fracturing fluids), thereby providing better control over emulsion-induced viscosification and better permeability of treatment fluids than other demulsifier compositions. In various embodiments, the demulsifier composition can reduce or eliminate emulsions in fluids produced after performing various subterranean operations, such as after performing stimulation operations, thereby providing better demulsification and better permeability of produced fluids than other demulsifier compositions. In various embodiments, the demulsifier composition can decrease or minimize the emulsion-induced viscosification of fluids produced after various subterranean operations, such as after performing stimulation operations, thereby providing better control over emulsion-induced viscosification and better permeability of produced fluids than other demulsifier compositions. In various embodiments, the demulsifier composition can decrease or eliminate emulsions when used to treat a produced fluid after it has been produced, thereby providing better post-production demulsification of produced fluids than other demulsifier compositions. In various embodiments, the demulsifier composition can decrease capillary pressure in the subterranean formation, alter wettability of the subterranean formation, or a combination thereof, thereby enhancing flowback of produced materials.

In various embodiments, the demulsifier composition can be used in an emulsion form or in a non-emulsion form (e.g., with no oil phase, or including an oil phase but free of emulsions), thereby providing more versatility than other demulsifier compositions. In various embodiments, the demulsifier composition in anon-emulsion form without an oil phase can facilitate adsorption of the demulsifier composition into the subterranean formation. The enhanced adsorption of the demulsifier composition can increase the wettability of the subterranean formation, which can lower the cap pressure, helping the demulsifier composition propagate through the subterranean formation.

In various embodiments, the demulsifier composition can be used in an emulsion form, wherein the demulsifier composition can surprisingly break other emulsions. In various embodiments, the demulsifier composition can include an emulsion having a lower interfacial tension than other emulsions useful as demulsifier compositions. In various embodiments, an emulsion in the demulsifier composition can be more stable under high salinity, can be more stable at higher temperatures, can have a lower freezing point, or a combination thereof, as compared to emulsions in other demulsifier compositions. In various embodiments, the demulsifier composition can have a higher RockPerm$^{SM}$ Gas value (RPG), a higher RockPerm$^{SM}$ Value (RPV), or a combination thereon, as compared to other demulsifier compositions.

In various embodiments, the demulsifier composition can be free of or can have less ethoxylated alkylphenols (e.g., alkyl-substituted phenols having a monoethoxy or poly ethoxy group on the hydroxy group of the phenol) or less ethyoxylated nonylphenols (e.g., nonyl-substituted phenols having a monoethoxy or poly ethoxy group on the hydroxy group of the phenol) than other demulsifier compositions. In various embodiments, the demulsifier composition can be more environmentally-friendly, more biodegradable, or a combination thereof, as compared to other demulsifier compositions.

Method of Treating a Subterranean Formation.

In various embodiments, the present invention provides a method of treating a subterranean formation. The method can include placing in the subterranean formation a demulsifier composition, such as any embodiment of a demulsifier composition described herein. The demulsifier composition can include an alkanolamide surfactant that is a $(C_1-C_{50})$ hydrocarbyl amide having groups $R^1$ and $R^2$ substituted on the amide nitrogen, wherein $R^1$ and $R^2$ are each independently selected from the group consisting of —H, —$(C_1-C_{50})$hydrocarbyl, and —$(C_1-C_{50})$hydrocarbylene-OH, wherein at least one of $R^1$ and $R^2$ is —$(C_1-C_{50})$hydrocarbylene-OH. The demulsifier composition can include an alkoxylated alcohol surfactant that is a $(C_1-C_{50})$hydrocarbyl-OH having a —$((C_2-C_3)$alkylene-O$)_n$—H group on the —OH group, wherein n is about 1 to about 100. The demulsifier composition can also include an amine-oxide surfactant. At each occurrence the $(C_1-C_{50})$hydrocarbyl and $(C_1-C_{50})$hydrocarbylene can be substituted or unsubstituted and can be independently selected.

In some embodiments, the method includes obtaining or providing the demulsifier composition. The obtaining or providing of the demulsifier composition can occur at any suitable time and at any suitable location. The obtaining or providing of the demulsifier composition can occur above the surface (e.g., one or more components of the demulsifier composition can be combined above-surface to form the demulsifier composition). The obtaining or providing of the demulsifier composition can occur in the subterranean formation (e.g., one or more components of the demulsifier composition can be combined downhole to form the demulsifier composition).

The placing of the demulsifier composition in the subterranean formation can include contacting the demulsifier composition and any suitable part of the subterranean formation, or contacting the demulsifier composition and a subterranean material, such as any suitable subterranean material. The subterranean formation can be any suitable subterranean formation. In some examples, the placing of the demulsifier composition in the subterranean formation includes contacting the demulsifier composition with or placing the demulsifier composition in at least one of a fracture, at least a part of an area surrounding a fracture, a flow pathway, an area surrounding a flow pathway, and an area desired to be fractured. The placing of the demulsifier composition in the subterranean formation can be any suitable placing and can include any suitable contacting between the subterranean formation and the demulsifier composition. The placing of the demulsifier composition in the subterranean formation can include at least partially depositing the demulsifier composition in a fracture, flow pathway, or area surrounding the same.

In some embodiments, the demulsifier composition can be placed in the subterranean formation neat. In some embodiments, the demulsifier composition can be placed in the subterranean formation as a component of another composition. For example, a subterranean treatment fluid can include the demulsifier composition, wherein the subterranean treatment fluid is a stimulation fluid, a hydraulic fracturing fluid, a drilling fluid, a spotting fluid, a clean-up fluid, a completion fluid, a remedial treatment fluid, an abandonment fluid, a pill, an acidizing fluid, a cementing fluid, a packer fluid, a logging fluid, or a combination thereof. The placing of the demulsifier composition in the subterranean formation can including placing the subterranean treatment fluid that includes the demulsifier composition in the subterranean formation. The method can include performing a subterranean formation treatment operation in the subterranean formation, such as using the subterranean treatment fluid that includes the demulsifier composition, or using a subterranean treatment fluid that is free of the demulsifier composition but with placement of the demulsifier composition in the subterranean formation before or after placing the subterranean treatment fluid in the subterranean formation. The method can include hydraulic fracturing, stimulation, drilling, spotting, clean-up, completion, remedial treatment, abandonment, acidizing, cementing, packing, logging, or a combination thereof. The subterranean treatment fluid can be a hydraulic fracturing fluid. The method can include hydraulically fracturing the subterranean formation with the demulsifier composition (e.g., which can be injected adjacent to a hydraulic fracturing fluid) or with a hydraulic fracturing fluid including the demulsifier composition.

The method can include hydraulic fracturing, such as a method of hydraulic fracturing to generate a fracture or flow pathway. The placing of the demulsifier composition in the subterranean formation or the contacting of the subterranean formation and the hydraulic fracturing can occur at any time with respect to one another; for example, the hydraulic fracturing can occur at least one of before, during, and after the contacting or placing. In some embodiments, the contacting or placing occurs during the hydraulic fracturing, such as during any suitable stage of the hydraulic fracturing, such as during at least one of a pre-pad stage (e.g., during injection of water with no proppant, and additionally optionally mid- to low-strength acid), a pad stage (e.g., during injection of fluid only with no proppant, with some viscosifier, such as to begin to break into an area and initiate fractures to produce sufficient penetration and width to allow proppant-laden later stages to enter), or a slurry stage of the fracturing (e.g., viscous fluid with proppant). The method can include performing a stimulation treatment at least one of before, during, and after placing the demulsifier composition in the subterranean formation in the fracture, flow pathway, or area surrounding the same. The stimulation treatment can be, for example, at least one of perforating, acidizing, injecting of cleaning fluids, propellant stimulation, and hydraulic fracturing. In some embodiments, the stimulation treatment at least partially generates a fracture or flow pathway where the demulsifier composition is placed in or contacted to, or the demulsifier composition is placed in or contacted to an area surrounding the generated fracture or flow pathway.

In various embodiments, the method includes reducing or eliminating an emulsion in the subterranean formation with one or more components of the demulsifier composition. In various embodiments, the method includes reducing or eliminating the formation of an emulsion in the subterranean formation with one or more components of the demulsifier composition. In other embodiments, an emulsion can be reduced or eliminated by one or more components of the demulsifier composition, or the formation of an emulsion can be reduced or eliminated by one or more components of the demulsifier composition, after the method is carried out.

In some embodiments, the demulsifier composition include water, e.g., a water phase. The water can be any suitable proportion of the demulsifier composition, such as about 0.01 wt % to about 99.99 wt % of the demulsifier composition, about 10 wt % to about 80 wt %, or about 0 wt %, or about 0.01 wt % or less, or less than, equal to, or greater than about 0.1 wt %, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9 wt %, or about 99.99 wt % or more of the demulsifier composition. The water can be any suitable water, such as fresh water, brine, produced water, flowback water, brackish water, or sea water.

The water can be a salt water. The salt can be any suitable salt, such as at least one of $NaBr$, $CaCl_2$, $CaBr_2$, $ZnBr_2$, $KCl$, $NaCl$, a carbonate salt, a sulfonate salt, sulfite salts, sulfide salts, a phosphate salt, a phosphonate salt, a magnesium salt, a bromide salt, a formate salt, an acetate salt, and a nitrate salt. The water can have any suitable total dissolved solids level, such as about 1,000 mg/L to about 250,000 mg/L, or about 1,000 mg/L or less, or about 5,000 mg/L, 10,000, 15,000, 20,000, 25,000, 30,000, 40,000, 50,000, 75,000, 100,000, 125,000, 150,000, 175,000, 200,000, 225,000, or about 250,000 mg/L or more. The aqueous liquid can have any suitable salt concentration, such as about 1,000 ppm to about 300,000 ppm, or about 1,000 ppm to about 150,000 ppm, or about 1,000 ppm or less, or about 5,000 ppm, 10,000, 15,000, 20,000, 25,000, 30,000, 40,000, 50,000, 75,000, 100,000, 125,000, 150,000, 175,000, 200,000, 225,000, 250,000, 275,000, or about 300,000 ppm or more. In some examples, the water can have a concentration of at least one of $NaBr$, $CaCl_2$, $CaBr_2$, $ZnBr_2$, $KCl$, and $NaCl$ of about 0.1% w/v to about 20% w/v, or about 0.1% w/v or less, or about 0.5% w/v, 1, 2, 3, 4, 5, 6, 7, 8, 9, 10, 11, 12, 13, 14, 15, 16, 17, 18, 19, 20, 21, 22, 23, 24, 25, 26, 27, 28, 29, or about 30% w/v or more. In various embodiments, an emulsion in the demulsifier composition can be stable under conditions of high salinity in the aqueous phase of the emulsion, such as any level of salinity described herein.

The demulsifier composition can include an organic solvent. The demulsifier composition can include one organic solvent or more than one organic solvent. The one or more organic solvents can be any suitable proportion of the demulsifier composition, such as about 0.01 wt % to about 99.99 wt % of the demulsifier composition, about 5 wt % to about 30 wt %, about 0 wt %, or about 0.01 wt % or less, or less than, equal to, or greater than about 0.1 wt %, 1, 2, 3, 4, 5, 6, 7, 8, 9, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9 wt %, or about 99.99 wt % or more of the demulsifier composition. The organic solvent can be a water-miscible organic solvent. The organic solvent can be a substituted or unsubstituted $(C_1-C_{20})$hydrocarbyl alcohol. The organic solvent can be a $(C_1-C_5)$alkyl alcohol. The organic solvent can be ethanol, iso-propanol, n-propanol, n-butanol, s-butanol, t-butanol, n-pentanol, a pentanol isomer, or a combination thereof. The organic solvent can be iso-propanol. In some embodiments, the organic solvent can lower the freeze point or pour point of the demulsifier composition.

The demulsifier composition can include an oil, e.g., an oil phase. The oil can include one or more oil components. The oil can form any suitable proportion of the demulsifier composition, such as about 0.01 wt % to about 99.99 wt %, about 10 wt % to about 80 wt %, about 0 wt %, or about 0.01 wt % or less, or less than, equal to, or greater than about 0.1 wt %, 1, 2, 3, 4, 5, 6, 7, 8, 9, 10, 12, 14, 16, 18, 20, 22, 24, 26, 28, 30, 32, 34, 36, 38, 40, 45, 50, 55, 60, 65, 70, 75, 80, 82, 84, 86, 88, 90, 91, 92, 93, 94, 95, 96, 97, 99, 99.9 wt %, or about 99.99 wt % or more of the demulsifier composition. The oil phase can be or can include a $(C_5-C_5)$hydrocarbon, a terpene, D-linonene, a dipentene, a pinene, an isoprene adduct, an isomer of an isoprene adduct (e.g., a $C_5-C_{15}$ isomer, such as a $C_{10}$ isomer), a $(C_5-C_{50})$alkane, a $(C_5-C_{50})$ isoalkane, a $(C_5-C_{50})$alkene, a silicone oil, a $(C_1-C_5)$alkyl ester of a substituted or unsubstituted $(C_1-C_{20})$carboxylic acid, ethyl lactate, or a combination thereof. The oil phase can include or can be petroleum distillates, having any suitable boiling point range, such as light petroleum distillates (e.g., having a boiling point range between about 100° C. and about 300° C. or greater than about 200° C. and less than about 250° C.). The oil phase can be hydrotreated petroleum distillate (e.g, dearomatized petroleum distillates). The oil phase can be hydrotreated light petroleum distillates having a boiling point range greater than about 200° C. and less than about 250° C.

In some embodiments, the demulsifier composition includes both the aqueous phase and the oil phase. The aqueous phase and the oil phase can be separate in the demulsifier composition (e.g., not mixed). The aqueous phase and the oil phase can be combined in the demulsifier composition as an emulsion of the aqueous phase and the oil phase. The emulsion can be any suitable emulsion. In some embodiments, the aqueous phase is the outer phase and the oil phase is the inner phase. In some embodiments, the oil phase is the outer phase and the aqueous phase is the inner phase. The size (e.g., the largest dimension) of the droplets of the inner phase of the emulsion in the outer phase of the emulsion can be any suitable size, such as about 0.001 micron to about 5 mm, or about 1 micron to about 1,000 microns, or about 0.005 microns to about 100 microns, or about 0.005 microns to about 0.3 microns, or about 0.01 microns to about 0.15 microns, or about 0.001 microns or less, or less than, equal to, or greater than about 0.005 microns, 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.25, 0.3, 0.35, 0.4, 0.45, 0.5, 0.6, 0.7, 0.8, 0.9, 1, 2, 3, 4, 5, 6, 8, 10, 15, 20, 25, 50, 75, 100, 125, 150, 175, 200, 250, 300, 350, 400, 450, 500, 600, 700, 800, 900 microns, 1 mm, 2, 3, 4 mm, or about 5 mm or more. The emulsion can be a microemulsion, with a size of the droplets of the inner phase of the emulsion in the outer phase of the emulsion being about 0.001 microns to about 1,000 microns, about 1 micron to about 1,000 microns, or about 1 micron to about 100 microns.

The emulsion can become unstable upon dilution with water, such that the emulsion begins to break, at least partially breaks, or substantially fully breaks. In some embodiments, the emulsion can be unstable when diluted to a concentration of about 0.2 wt % in water. In some embodiments, the emulsion can be unstable at a concentration of about 0.2 wt % in brine. In some embodiments, the emulsion can be unstable at a concentration of 0.2 wt % in water including 7 wt % KCl.

The present method is not limited to any specific mechanism of action. The emulsion can include at least one surfactant that is more readily soluble in oil, e.g., an alkanolamide surfactant. Upon dilution, the alkanolamide surfactant can partition into a large native (e.g., formation) oil phase, facilitating demulsification of the formation oil phase. The demulsifying behavior is enhanced by the presence of an alkoxylated alcohol surfactant and an amine-oxide surfactant.

The demulsifier composition can have any suitable Rock-Perm$^{SM}$ Value (RPV), such as about 1 to about 100, or about 3 to about 40, or about 1 or more, or less than, equal to, or greater than about 2, 3, 4, 5, 6, 7, 8, 9, 10, 12, 14, 16, 18, 20, 22, 24, 26, 28, 30, 32, 34, 36, 38, 40, 45, 50, 55, 60, 65, 70, 75, 80, 85, 90, 95, or about 100 or more.

The demulsifier composition can have any suitable Rock-Perm$^{SM}$ Gas value (RPG), such as about 40 to about 100, or about 50 to about 80, or about 40 or less, or less than, equal to, or more than about 42, 44, 46, 48, 50, 52, 54, 56, 58, 60, 62, 64, 66, 68, 70, 72, 74, 76, 78, 80, 82, 84, 86, 88, 90, 95, or about 100 or more.

In various embodiments, an emulsion in the demulsifier composition can be stable at high temperatures, such as at temperatures up to about 50° C. to about 400° C., or about 100° C. to about 300° C., or up to about 50° C. or more, or up to less than, equal to, or greater than about 60° C., 70, 80, 90, 100, 110, 120, 130, 140, 150, 160, 170, 180, 190, 200, 220, 240, 260, 280, 300, 350, or about 400° C. or more.

In various embodiments, an emulsion in the demulsifier composition can be stable under conditions of high salinity, wherein the emulsion is placed into an aqueous solution having high salinity. For example, the emulsion can be stable under salinity conditions including any suitable dissolved salt, such as at least one of NaBr, CaCl$_2$, CaBr$_2$, ZnBr$_2$, KCl, NaCl, a carbonate salt, a sulfonate salt, sulfite salts, sulfide salts, a phosphate salt, a phosphonate salt, a magnesium salt, a bromide salt, a formate salt, an acetate salt, and a nitrate salt, at any suitable concentration. The emulsion can be stable in the presence of a total dissolved solids level of about 0 mg/L to about 250,000 mg/L, or about 1,000 mg/L or less, or about 5,000 mg/L, 10,000, 15,000, 20,000, 25,000, 30,000, 40,000, 50,000, 75,000, 100,000, 125,000, 150,000, 175,000, 200,000, 225,000, or about 250,000 mg/L or more. The emulsion can be stable in the presence of any suitable salt concentration, such as about 1,000 ppm to about 300,000 ppm, or about 1,000 ppm to about 150,000 ppm, or about 1,000 ppm or less, or about 5,000 ppm, 10,000, 15,000, 20,000, 25,000, 30,000, 40,000, 50,000, 75,000, 100,000, 125,000, 150,000, 175,000, 200, 000, 225,000, 250,000, 275,000, or about 300,000 ppm or more. The emulsion can be stable in the presence of a concentration of at least one of NaBr, CaCl$_2$, CaBr$_2$, ZnBr$_2$, KCl, and NaCl of about 0.1% w/v to about 20% w/v, or about 0.1% w/v or less, or about 0.5% w/v, 1, 2, 3, 4, 5, 6, 7, 8, 9, 10, 11, 12, 13, 14, 15, 16, 17, 18, 19, 20, 21, 22, 23, 24, 25, 26, 27, 28, 29, or about 30% w/v or more.

In various embodiments, the demulsifier composition can have a lower freezing point. For example, the demulsifier composition can freeze below about 10° C., or below more than, equal to, or less than about 5° C., 0, −5, −10, −15, −20, −25, −30, −35, −40, −45° C., or about −50° C. or less.

Alkanolamide Surfactant.

The demulsifier composition can include an alkanolamide surfactant. The demulsifier composition can include one alkanolamide surfactant or more than one alkanolamide surfactant. The one or more alkanolamide surfactants can form any suitable proportion of the demulsifier composition, such as about 1 wt % to about 90 wt %, about 5 wt % to about 40 wt %, or about 1 wt % or less, or less than, equal to, or greater than about 2 wt %, 3, 4, 5, 6, 7, 8, 9, 10, 11, 12, 13, 14, 15, 16, 17, 18, 19, 20, 22, 24, 26, 28, 30, 32, 34, 36, 38, 40, 45, 50, 55, 60, 65, 70, 75, 80, 85 wt %, or about 90 wt % or more of the demulsifier composition. In various embodiments, the alkanolamide surfactant can effectively solubilize an oil phase of the demulsifier composition.

The alkanolamide surfactant can be a (C$_1$-C$_{50}$)hydrocarbyl amide having groups R$^1$ and R$^2$ substituted on the amide nitrogen, wherein R$^1$ and R$^2$ can each be independently selected from the group consisting of —H, —(C$_1$-C$_{50}$) hydrocarbyl, and —(C$_1$-C$_{50}$)hydrocarbylene-OH, wherein at least one of R$^1$ and R$^2$ can be —(C$_1$-C$_{50}$)hydrocarbylene-OH, wherein the —OH group can be substituted at any suitable position on the —(C$_1$-C$_{50}$)hydrocarbylene group, such as a pendant secondary position or a terminal primary position. The alkanolamide surfactant can have the structure:

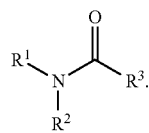

The variable R$^3$ can be the (C$_1$-C$_{50}$)hydrocarbyl group. The alkanolamide surfactant can be an alkanolamide of a tall oil fatty acid. The alkanolamide surfactant can be the alkanolamide of a tall oil fatty acid having the structure R$^3$—C(O)—OH. The (C$_1$-C$_{50}$)hydrocarbyl groups and the —(C$_1$-C$_{50}$)hydrocarbylene-OH group of the alkanolamide surfactant can be unsubstituted. The variable R$^3$ can be a substituted or unsubstituted (C$_{12}$-C$_{25}$)hydrocarbyl. The variable $R^3$ can be a substituted or unsubstituted $(C_{15}-C_{17})$ hydrocarbyl. The alkanolamide surfactant can be a tall oil $(C_{16}-C_{18})$fatty acid alkanolamide. Both of $R^1$ and $R^2$ can be independently —$(C_1-C_{50})$hydrocarbylene-OH. One of $R^1$ and $R^2$ can be independently —$(C_1-C_{50})$hydrocarbylene-OH. The variables $R^1$ and $R^2$ can be independently selected from —H, substituted or unsubstituted $(C_1-C_{10})$hydrocarbyl, and substituted or unsubstituted —$(C_1-C_{10})$hydrocarbylene-OH. The variables $R^1$ and $R^2$ can be independently selected from —H, —$(C_1-C_5)$alkyl, and —$(C_1-C_5)$alkylene-OH. The variables $R^1$ and $R^2$ are can be each —$CH_2$—$CH_2$—OH.

The alkanolamide surfactant can have the structure:

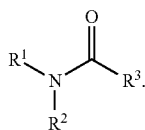

The variable $R^3$ can be a substituted or unsubstituted $(C_{12}-C_{25})$hydrocarbyl or $(C_{15}-C_{17})$hydrocarbyl of a tall oil fatty acid having the structure $R^3$—C(O)—OH. The variables $R^1$ and $R^2$ can each be —$(C_1-C_{10})$alkylene-OH or —$CH_2$—$CH_2$—OH.

Alkoxylated Alcohol Surfactant.

The demulsifier composition can include an alkoxylated alcohol surfactant. The demulsifier composition can include one alkoxylated alcohol surfactant or more than one alkoxylated alcohol surfactant. The one or more alkoxylated alcohol surfactants can form any suitable proportion of the demulsifier composition, such as about 1 wt % to about 90 wt %, about 5 wt % to about 40 wt %, or about 1 wt % or less, or less than, equal to, or greater than about 2 wt %, 3, 4, 5, 6, 7, 8, 9, 10, 11, 12, 13, 14, 15, 16, 17, 18, 19, 20, 22, 24, 26, 28, 30, 32, 34, 36, 38, 40, 45, 50, 55, 60, 65, 70, 75, 80, 85, or about 90 wt % or more of the demulsifier composition. In various embodiments, the alkoxylated alcohol surfactant can provide high temperature stability and salt tolerance to an emulsion in the demulsifier composition.

The alkoxylated alcohol surfactant can be a $(C_1-C_{50})$ hydrocarbyl-OH having a —$((C_2-C_3)$alkylene-O$)_n$—H group on the —OH group. The alkoxylated alcohol surfactant can have the structure:

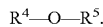

The variable $R^4$ can be the $(C_1-C_{50})$hydrocarbyl group. The alcohol can be a secondary alcohol. The oxygen atom can be bound to $R^4$ at a carbon atom having two other carbon atoms bound thereto in $R^4$. The variable $R^4$ can be unsubstituted aside from the alcohol. The variable $R^4$ can be a $(C_5-C_{25})$ hydrocarbyl group. The variable $R^4$ can be a $(C_{10}-C_{20})$ hydrocarbyl group. The variable $R^4$ can be a $(C_{15})$hydrocarbyl group. The variable $R^5$ can be the —$((C_2-C_3)$alkylene-O$)_n$—H group. The variable $R^5$ can be a -(ethylene-O$)_n$—H group. The variable $R^5$ can be a -(ethylene-O$)_7$—H group. The variable n can be about 1 to about 100, about 2 to about 20, about 5 to about 10, or about 1, 2, 3, 4, 5, 6, 7, 8, 9, 10, 11, 12, 13, 14, 15, 16, 17, 18, 19, 20, or less than, equal to, or greater than about 25, 30, 35, 40, 45, 50, 55, 60, 65, 70, 75, 80, 85, 90, 95, or about 100 or more. The variable n can be about 7.

The alkoxylated alcohol surfactant can be a $(C_{10-20})$ hydrocarbon including a secondary alcohol group, wherein the $(C_{10-20})$hydrocarbon is otherwise unsubstituted, wherein the secondary alcohol group includes a —$(CH_2-CH_2-O)_{5-10}$—H group thereon. The alkoxylated alcohol surfactant can be a $(C_{15})$hydrocarbon including a secondary alcohol group, wherein the $(C_{15})$hydrocarbon is otherwise unsubstituted, wherein the secondary alcohol group includes a —$(CH_2-CH_2-O)_7$—H group thereon.

Amine-Oxide Surfactant.

The demulsifier composition can include an amine-oxide surfactant. The demulsifier composition can include one amine-oxide surfactant or more than one amine-oxide surfactant. The one or more amine-oxide surfactants can form any suitable proportion of the demulsifier composition, such as about 0.01 wt % to about 90 wt %, about 0.01 wt % to about 20 wt %, or about 0.01 wt % or less, or less than, equal to, or greater than about 0.1 wt %, 0.2, 0.4, 0.6, 0.8, 1, 1.2, 1.4, 1.6, 1.8, 2, 2.2, 2.4, 2.6, 2.8, 3, 3.5, 4, 4.5, 5, 6, 7, 8, 9, 10, 12, 14, 16, 18, 20, 22, 24, 26, 28, 30, 32, 34, 36, 38, 40, 42, 44, 45, 50, 55, 60, 65, 70, 75, 80, 85 wt %, or about 90 wt % or more. In various embodiments, the amine-oxide surfactant can provide improved performance, such as improved demulsification performance, as compared to a corresponding demulsifier composition that lacks the amine-oxide surfactant.

The amine-oxide surfactant can have the structure:

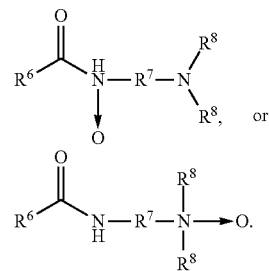

The variable $R^6$ can be substituted or unsubstituted $(C_1-C_{50})$ hydrocarbyl. The variable $R^6$ can be $(C_5-C_{30})$hydrocarbyl. The variable $R^6$ can be $(C_5-C_{20})$alkyl. The variable $R^6$ can be $(C_{11}-C_{13})$alkyl. The variable $R^7$ can be substituted or unsubstituted $(C_1-C_{20})$hydrocarbylene. The variable $R^7$ can be a $(C_1-C_{10})$hydrocarbylene. The variable $R^7$ can be a $(C_1-C_5)$ alkylene. The variable $R^7$ can be propylene. At each occurrence, $R^8$ can be independently substituted or unsubstituted $(C_1-C_{20})$hydrocarbyl. The variable $R^8$ can be $(C_1-C_5)$alkyl. The variable $R^8$ can be methyl.

The amine-oxide surfactant can have the structure:

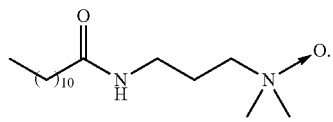

The amine-oxide surfactant can have the structure:

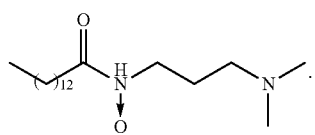

The amine-oxide surfactant can have the structure:

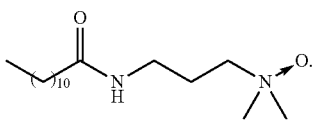

The demulsifier composition can further include another amine-oxide surfactant, with the other amine-oxide surfactant having the structure:

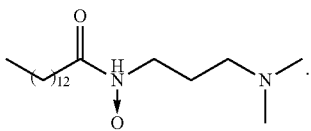

Method of Treating Produced Petroleum Including an Emulsion.

In various embodiments, the present invention provides a method of treating a produced petroleum including an emulsion. The method can include contacting the produced petroleum with an embodiment of the demulsifier composition described herein, such that the emulsion in the produced petroleum is reduced or eliminated. For example, the demulsifier composition can include an alkanolamide surfactant that is a $(C_1-C_{50})$hydrocarbyl amide having groups $R^1$ and $R^2$ substituted on the amide nitrogen, wherein $R^1$ and $R^2$ are each independently selected from the group consisting of —H, —$(C_1-C_{50})$hydrocarbyl, and —$(C_1-C_{50})$hydrocarbylene-OH, wherein at least one of $R^1$ and $R^2$ is —$(C_1-C_{50})$hydrocarbylene-OH. The demulsifier composition can include an alkoxylated alcohol surfactant that is a $(C_1-C_{50})$hydrocarbyl-OH having a —$((C_2-C_3)$alkylene-O$)_n$—H group on the —OH group, wherein n is about 1 to about 100. The demulsifier composition can include an amine-oxide surfactant. At each occurrence the $(C_1-C_{50})$hydrocarbyl and $(C_1-C_{50})$hydrocarbylene can be substituted or unsubstituted and are independently selected.

Other Components.

The demulsifier composition or a mixture including the demulsifier composition (e.g., a subterranean treatment fluid including the demulsifier composition, or another mixture) can include any suitable additional component in any suitable proportion, such that the demulsifier composition or mixture including the same can be used as described herein. Any component listed in this section can be present or not present in the demulsifier composition or a mixture including the same.

In some embodiments, the demulsifier composition or a mixture including the same includes one or more viscosifiers. The viscosifier can be any suitable viscosifier. The viscosifier can affect the viscosity of the demulsifier composition or a solvent that contacts the demulsifier composition at any suitable time and location. In some embodiments, the viscosifier provides an increased viscosity at least one of before injection into the subterranean formation, at the time of injection into the subterranean formation, during travel through a tubular disposed in a borehole, once the demulsifier composition reaches a particular subterranean location, or some period of time after the demulsifier composition reaches a particular subterranean location. In some embodiments, the viscosifier can be about 0.000.1 wt % to about 10 wt % of the demulsifier composition or a mixture including the same, about 0.004 wt % to about 0.01 wt %, or about 0.000.1 wt % or less, or less than, equal to, or greater than about 0.000.5 wt %, 0.001, 0.005, 0.01, 0.05, 0.1, 0.5, 1, 2, 3, 4, 5, 6, 7, 8, 9, or about 10 wt % or more of the demulsifier composition or a mixture including the same.

The viscosifier can include at least one of a substituted or unsubstituted polysaccharide, and a substituted or unsubstituted polyalkene (e.g., a polyethylene, wherein the ethylene unit is substituted or unsubstituted, derived from the corresponding substituted or unsubstituted ethene), wherein the polysaccharide or polyalkene is crosslinked or uncrosslinked. The viscosifier can include a polymer including at least one repeating unit derived from a monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide. The viscosifier can include a crosslinked gel or a crosslinkable gel. The viscosifier can include at least one of a linear polysaccharide, and a poly($(C_2-C_{10})$alkene), wherein the $(C_2-C_{10})$ alkene is substituted or unsubstituted. The viscosifier can include at least one of poly(acrylic acid) or $(C_1-C_5)$alkyl esters thereof, poly(methacrylic acid) or $(C_1-C_5)$alkyl esters thereof, poly (vinyl acetate), poly(vinyl alcohol), poly(ethylene glycol), poly(vinyl pyrrolidone), polyacrylamide, poly (hydroxyethyl methacrylate), alginate, chitosan, curdlan, dextran, derivatized dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, diutan, welan, starch, derivatized starch, tamarind, tragacanth, guar gum, derivatized guar gum (e.g., hydroxypropyl guar, carboxy methyl guar, or carboxymethyl hydroxypropyl guar), gum ghatti, gum arabic, locust bean gum, karaya gum, cellulose, and derivatized cellulose (e.g., carboxymethyl cellulose, hydroxyethyl cellulose, carboxymethyl hydroxy ethyl cellulose, hydroxypropyl cellulose, or methyl hydroxy ethyl cellulose).

In some embodiments, the viscosifier can include at least one of a poly(vinyl alcohol) homopolymer, poly(vinyl alcohol) copolymer, a crosslinked poly(vinyl alcohol) homopolymer, and a crosslinked poly(vinyl alcohol) copolymer. The viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstituted $(C_2-C_{50})$hydrocarbyl having at least one aliphatic unsaturated C—C bond therein, and a substituted or unsubstituted $(C_2-C_{50})$alkene. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted $(C_1-C_{20})$alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted $(C_1-C_{20})$alkyl ester thereof. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethylpentanoate, vinyl 3-ethylhexanoate, maleic anhydride, a substituted or unsubstituted $(C_1-C_{20})$alkenoic substituted or unsubstituted $(C_1-C_{20})$alkanoic anhydride, a substituted or unsubstituted $(C_1-C_{20})$alkenoic substituted or unsubstituted $(C_1-C_{20})$alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—$(C_1-C_{10})$alkenyl nitrogen-containing substituted or unsubstituted $(C_1-C_{10})$heterocycle. The viscosifier can include a poly(vinyl alcohol) copolymer or a crosslinked poly(vinyl alcohol) copolymer including at least one of a graft, linear, branched, block, and random copolymer that includes a poly(vinylalcohol/acrylamide) copolymer, a poly (vinylalcohol/2-acrylamido-2-methylpropanesulfonic acid) copolymer, a poly (acrylamide/2-acrylamido-2-methylpropanesulfonic acid) copolymer, or a poly(vinylalcohol/N-vinylpyrrolidone) copolymer. The viscosifier can include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and an ion thereof. The viscosifier can include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

In various embodiments, the demulsifier composition or a mixture including the same can include one or more crosslinkers. The crosslinker can be any suitable crosslinker. In some examples, the crosslinker can be incorporated in a crosslinked viscosifier, and in other examples, the crosslinker can crosslink a crosslinkable material (e.g., downhole). The crosslinker can include at least one of chromium, aluminum, antimony, zirconium, titanium, calcium, boron, iron, silicon, copper, zinc, magnesium, and an ion thereof. The crosslinker can include at least one of boric acid, borax, a borate, a $(C_1-C_{30})$hydrocarbyl boronic acid, a $(C_1-C_{30})$ hydrocarbyl ester of a $(C_1-C_{30})$hydrocarbyl boronic acid, a $(C_1-C_{30})$hydrocarbyl boronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate. In some embodiments, the crosslinker can be a $(C_1-C_{20})$alkylenebiacrylamide (e.g., methylenebisacrylamide), a poly($(C_1-C_{20})$alkenyl)-substituted mono- or poly-$(C_1-C_{20})$alkyl ether (e.g., pentaerythritol allyl ether), and a poly($C_2-C_{20}$)alkenylbenzene (e.g., divinylbenzene). In some embodiments, the crosslinker can be at least one of alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, and 1,6-hexanediol dimethacrylate. The crosslinker can be about 0.000.01 wt % to about 5 wt % of the demulsifier composition or a mixture including the same, about 0.001 wt % to about 0.01 wt %, or about 0.000.01 wt % or less, or less than, equal to, or greater than about 0.000.05 wt %, 0.000,1, 0.000,5, 0.001, 0.005, 0.01, 0.05, 0.1, 0.5, 1, 2, 3, 4, or about 5 wt % or more.

In some embodiments, the demulsifier composition or a mixture including the same can include one or more breakers. The breaker can be any suitable breaker, such that the surrounding fluid (e.g., a fracturing fluid) can be at least partially broken for more complete and more efficient recovery thereof, such as at the conclusion of the hydraulic fracturing treatment. In some embodiments, the breaker can be encapsulated or otherwise formulated to give a delayed-release or a time-release of the breaker, such that the surrounding liquid can remain viscous for a suitable amount of time prior to breaking. The breaker can be any suitable breaker; for example, the breaker can be a compound that includes at least one of a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a chloride, fluoride, bromide, phosphate, or sulfate ion. In some examples, the breaker can be an oxidative breaker or an enzymatic breaker. An oxidative breaker can be at least one of a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a persulfate, percarbonate, perborate, peroxide, perphosphosphate, permanganate, chlorite, or hypochlorite ion. An enzymatic breaker can be at least one of an alpha or beta amylase, amyloglucosidase, oligoglucosidase, invertase, maltase, cellulase, hemicellulase, and mannanohydrolase. The breaker can be about 0.001 wt % to about 30 wt % of the demulsifier composition or a mixture including the same, or about 0.01 wt % to about 5 wt %, or about 0.001 wt % or less, or less than, equal to, or greater than about 0.005 wt %, 0.01, 0.05, 0.1, 0.5, 1, 2, 3, 4, 5, 6, 8, 10, 12, 14, 16, 18, 20, 22, 24, 26, 28, or about 30 wt % or more.

The demulsifier composition, or a mixture including the demulsifier composition, can include any suitable fluid. For example, the fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2-C_{40}$ fatty acid $C_1-C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, naphthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of the demulsifier composition, or a mixture including the same, or about 0.001 wt % or less, or less than, equal to, or greater than about 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

A mixture including the demulsifier composition can include any suitable downhole fluid. The demulsifier composition can be combined with any suitable downhole fluid before, during, or after the placement of the demulsifier composition in the subterranean formation or the contacting of the demulsifier composition and the subterranean material. In some examples, the demulsifier composition is combined with a downhole fluid above the surface, and then the combined composition is placed in a subterranean formation or contacted with a subterranean material. In another example, the demulsifier composition is injected into a subterranean formation to combine with a downhole fluid, and the combined composition is contacted with a subterranean material or is considered to be placed in the subterranean formation. The placement of the demulsifier composition in the subterranean formation can include contacting the subterranean material and the mixture. Any suitable weight percent of a mixture including the demulsifier composition that is placed in the subterranean formation or contacted with the subterranean material can be the downhole fluid, such as about 0.001 wt % to about 99.999 wt %, about 0.01 wt % to about 99.99 wt %, about 0.1 wt % to about 99.9 wt %, about 20 wt % to about 90 wt %, or about 0.001 wt % or less, or less than, equal to, or greater than about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the demulsifier composition or mixture including the same.

In some embodiments, the demulsifier composition, or a mixture including the same, can include any suitable amount of any suitable material used in a downhole fluid. For example, the demulsifier composition or a mixture including the same can include water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, polyacrylamide, a polymer or combination of polymers, antioxidants, heat stabilizers, foam control agents, solvents, diluents, plasticizer, filler or inorganic particle, pigment, dye, precipitating agent, oil-wetting agents, set retarding additives, surfactants, gases, weight reducing additives, heavy-weight additives, lost circulation materials, filtration control additives, salts (e.g., any suitable salt, such as potassium salts such as potassium chloride, potassium bromide, potassium formate; calcium salts such as calcium chloride, calcium bromide, calcium formate; cesium salts such as cesium chloride, cesium bromide, cesium formate, or a combination thereof), fibers, thixotropic additives, breakers, crosslinkers, rheology modifiers, curing accelerators, curing retarders, pH modifiers, chelating agents, scale inhibitors, enzymes, resins, water control materials, disproportionate permeability modifiers, relative permeability modifiers, oxidizers, markers, Portland cement, pozzolana cement, gypsum cement, high alumina content cement, slag cement, sorel cement (e.g., $Mg_4Cl_2(OH)_6(H_2O)_8$), micro matrix cement, silica cement, fly ash, metakaolin, shale, zeolite, a crystalline silica compound, amorphous silica, hydratable clays, microspheres, lime, or a combination thereof. In various embodiments, the demulsifier composition or a mixture including the same can include one or more additive components such as: COLDTROL®, ATC®, OMC 2™, and OMC 42™ thinner additives; RHEMOD™ viscosifier and suspension agent; TEMPERUS™ and VIS-PLUS® additives for providing temporary increased viscosity; TAU-MOD™ viscosifying/suspension agent; ADAPTA®, DURATONE® HT, THERMO TONE™, BDF™-366, and BDF™-454 filtration control agents; LIQ-UITONE™ polymeric filtration agent and viscosifier; FAC-TANT™ emulsion stabilizer; LE SUPERMUL™, EZ MUL® NT, and FORTI-MUL® emulsifiers; DRIL TREAT® oil wetting agent for heavy fluids; AQUATONE-S™ wetting agent; BARACARB® bridging agent; BAROID® weighting agent; BAROLIFT® hole sweeping agent; SWEEP-WATE® sweep weighting agent; BDF-508 rheology modifier; and GELTONE® II organophilic clay. In various embodiments, the demulsifier composition or a mixture including the same can include one or more additive components such as: X-TEND® II, PAC™-R, PAC™-L, LIQUI-VIS® EP, BRINEDRIL-VIS™, BARAZAN®, N-VIS®, and AQUAGEL® viscosifiers; THERMA-CHEK®, N-DRIL™, N-DRIL™ HT PLUS, IMPER-MEX®, FILTERCHEK™, DEXTRID®, CARBONOX®, and BARANEX® filtration control agents; PERFORMA-TROL®, GEM™, EZ-MUD®, CLAY GRABBER®, CLAYSEAL®, CRYSTAL-DRIL®, and CLAY SYNC™ II shale stabilizers; NXS-LUBE™, EP MUDLUBE®, and DRIL-N-SLIDE™ lubricants; QUIK-THIN®, IRON-THIN™, THERMA-THIN®, and ENVIRO-THIN™ thinners; SOURSCAV™ scavenger; BARACOR® corrosion inhibitor; and WALL-NUT®, SWEEP-WATE®, STOP-PIT™, PLUG-GIT®, BARACARB®, DUO-SQUEEZE®, BAROFIBRE™, STEELSEAL®, and HYDRO-PLUG® lost circulation management materials. Any suitable proportion of the demulsifier composition or mixture including the demulsifier composition can include any optional component listed in this paragraph, such as about 0.001 wt % to about 99.999 wt %, about 0.01 wt % to about 99.99 wt %, about 0.1 wt % to about 99.9 wt %, about 20 to about 90 wt %, or about 0.001 wt % or less, or less than, equal to, or greater than about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the demulsifier composition or mixture.

A drilling fluid, also known as a drilling mud or simply "mud," is a specially designed fluid that is circulated through a wellbore as the wellbore is being drilled to facilitate the drilling operation. The drilling fluid can be water-based or oil-based. The drilling fluid can carry cuttings up from beneath and around the bit, transport them up the annulus, and allow their separation. Also, a drilling fluid can cool and lubricate the drill bit as well as reduce friction between the drill string and the sides of the hole. The drilling fluid aids in support of the drill pipe and drill bit, and provides a hydrostatic head to maintain the integrity of the wellbore walls and prevent well blowouts. Specific drilling fluid systems can be selected to optimize a drilling operation in accordance with the characteristics of a particular geological formation. The drilling fluid can be formulated to prevent unwanted influxes of formation fluids from permeable rocks and also to form a thin, low permeability filter cake that temporarily seals pores, other openings, and formations penetrated by the bit. In water-based drilling fluids, solid particles are suspended in a water or brine solution containing other components. Oils or other non-aqueous liquids can be emulsified in the water or brine or at least partially solubilized (for less hydrophobic non-aqueous liquids), but water is the continuous phase. A mixture including the demulsifier composition can include a drilling fluid in any suitable amount, such as about 1 wt % or less, or less than, equal to, or greater than about 2 wt %, 3, 4, 5, 10, 15, 20, 30, 40, 50, 60, 70, 80, 85, 90, 95, 96, 97, 98, 99, 99.9, 99.99, or about 99.999 wt % or more.

A water-based drilling fluid in embodiments of the present invention can be any suitable water-based drilling fluid. In various embodiments, the drilling fluid can include at least one of water (fresh or brine), a salt (e.g., calcium chloride, sodium chloride, potassium chloride, magnesium chloride, calcium bromide, sodium bromide, potassium bromide, calcium nitrate, sodium formate, potassium formate, cesium formate), aqueous base (e.g., sodium hydroxide or potassium hydroxide), alcohol or polyol, cellulose, starches, alkalinity control agents, density control agents such as a density modifier (e.g., barium sulfate), surfactants (e.g., betaines, alkali metal alkylene acetates, sultaines, ether carboxylates), emulsifiers, dispersants, polymeric stabilizers, crosslinking agents, polyacrylamides, polymers or combinations of polymers, antioxidants, heat stabilizers, foam control agents, solvents, diluents, plasticizers, filler or inorganic particles (e.g., silica), pigments, dyes, precipitating agents (e.g., silicates or aluminum complexes), and rheology modifiers such as thickeners or viscosifiers (e.g., xanthan gum, laponite gels, geltones, sepiolite gel, TAU-MOD®). Any ingredient listed in this paragraph can be either present or not present in the mixture.

An oil-based drilling fluid or mud in embodiments of the present invention can be any suitable oil-based drilling fluid. In various embodiments, the drilling fluid can include at least one of an oil-based fluid (or synthetic fluid), saline, aqueous solution, emulsifiers, other agents or additives for suspension control, weight or density control, oil-wetting agents, fluid loss or filtration control agents, and rheology control agents. An oil-based or invert emulsion-based drilling fluid can include between about 10:90 to about 95:5, or about 50:50 to about 95:5, by volume of oil phase to water phase. A substantially all oil mud includes about 100% liquid phase oil by volume (e.g., substantially no internal aqueous phase).

A pill is a relatively small quantity (e.g., less than about 500 bbl, or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone. A pill can include any component described herein as a component of a drilling fluid.

A cement fluid can include an aqueous mixture of at least one of cement and cement kiln dust. The demulsifier composition can form a useful combination with cement or cement kiln dust. The cement kiln dust can be any suitable cement kiln dust. Cement kiln dust can be formed during the manufacture of cement and can be partially calcined kiln feed that is removed from the gas stream and collected in a dust collector during a manufacturing process. Cement kiln dust can be advantageously utilized in a cost-effective manner since kiln dust is often regarded as a low value waste product of the cement industry. Some embodiments of the cement fluid can include cement kiln dust but no cement, cement kiln dust and cement, or cement but no cement kiln dust. The cement can be any suitable cement. The cement can be a hydraulic cement. A variety of cements can be utilized in accordance with embodiments of the present invention; for example, those including calcium, aluminum, silicon, oxygen, iron, or sulfur, which can set and harden by reaction with water. Suitable cements can include Portland cements, pozzolana cements, gypsum cements, high alumina content cements, slag cements, sorel cements (e.g., $Mg_4Cl_2(OH)_6(H_2O)_8$), micro matrix cements, silica cements, and combinations thereof. In some embodiments, the Portland cements that are suitable for use in embodiments of the present invention are classified as Classes A, C, H, and G cements according to the American Petroleum Institute, *API Specification for Materials and Testing for Well Cements*, API Specification 10, Fifth Ed., Jul. 1, 1990. A cement can be generally included in the cementing fluid in an amount sufficient to provide the desired compressive strength, density, or cost. In some embodiments, the hydraulic cement can be present in the cementing fluid in an amount in the range of from 0 wt % to about 100 wt %, about 0 wt % to about 95 wt %, about 20 wt % to about 95 wt %, or about 50 wt % to about 90 wt %. A cement kiln dust can be present in an amount of at least about 0.01 wt %, or about 5 wt % to about 80 wt %, or about 10 wt % to about 50 wt %.

Optionally, other additives can be added to a cement or kiln dust-containing composition of embodiments of the present invention as deemed appropriate by one skilled in the art, with the benefit of this disclosure. Any optional ingredient listed in this paragraph can be either present or not present in the demulsifier composition or a mixture including the same. For example, the demulsifier composition can include fly ash, metakaolin, shale, zeolite, set retarding additive, surfactant, a gas, accelerators, weight reducing additives, heavy-weight additives, lost circulation materials, filtration control additives, dispersants, and combinations thereof. In some examples, additives can include crystalline silica compounds, amorphous silica, salts, fibers, hydratable clays, microspheres, pozzolan lime, thixotropic additives, combinations thereof, and the like.

In various embodiments, the demulsifier composition or mixture including the same can include a proppant, a resin-coated proppant, an encapsulated resin, or a combination thereof. A proppant is a material that keeps an induced hydraulic fracture at least partially open during or after a fracturing treatment. Proppants can be transported into the subterranean formation (e.g., downhole) to the fracture using fluid, such as fracturing fluid or another fluid. A higher-viscosity fluid can more effectively transport proppants to a desired location in a fracture, especially larger proppants, by more effectively keeping proppants in a suspended state within the fluid. Examples of proppants can include sand, gravel, glass beads, polymer beads, ground products from shells and seeds such as walnut hulls, and manmade materials such as ceramic proppant, bauxite, tetrafluoroethylene materials (e.g., TEFLON™ polytetrafluoroethylene), fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, formation cuttings (e.g., reinjected), hollow glass microspheres, and solid glass, or mixtures thereof. In some embodiments, the proppant can have an average particle size, wherein particle size is the largest dimension of a particle, of about 0.001 mm to about 3 mm, about 0.15 mm to about 2.5 mm, about 0.25 mm to about 0.43 mm, about 0.43 mm to about 0.85 mm, about 0.0001 mm to about 3 mm, about 0.015 mm to about 2.5 mm, about 0.025 mm to about 0.43 mm, about 0.043 mm to about 0.85 mm, about 0.085 mm to about 1.18 mm, about 0.85 mm to about 1.18 mm, about 1.18 mm to about 1.70 mm, or about 1.70 to about 2.36 mm. In some embodiments, the proppant can have a distribution of particle sizes clustering around multiple averages, such as one, two, three, or four different average particle sizes. The demulsifier composition or mixture can include any suitable amount of proppant, such as about 0.01 wt % to about 99.99 wt %, about 0.1 wt % to about 80 wt %, about 10 wt % to about 60 wt %, or about 0.01 wt % or less, or less than, equal to, or greater than about 0.1 wt %, 1, 2, 3, 4, 5, 10, 15, 20, 30, 40, 50, 60, 70, 80, 85, 90, 91, 92, 93, 94, 95, 96, 97, 98, 99, about 99.9 wt %, or about 99.99 wt % or more.

Drilling Assembly.

In various embodiments, the demulsifier composition disclosed herein can directly or indirectly affect one or more components or pieces of equipment associated with the preparation, delivery, recapture, recycling, reuse, and/or disposal of the demulsifier composition. For example, and with reference to FIG. 1, the demulsifier composition can directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 can include a drilling platform 102 that supports a derrick 104 having a traveling block 106 for raising and lowering a drill string 108. The drill string 108 can include drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a wellbore 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the wellbore 116. At the surface, the recirculated or spent drilling fluid 122 exits the annulus 126 and can be conveyed to one or more fluid processing unit(s) 128 via an interconnecting flow line 130. After passing through the fluid processing unit(s) 128, a "cleaned" drilling fluid 122 is deposited into a nearby retention pit 132 (e.g., a mud pit). While the fluid processing unit(s) 128 is illustrated as being arranged at the outlet of the wellbore 116 via the annulus 126, those skilled in the art will readily appreciate that the fluid processing unit(s) 128 can be arranged at any other location in the drilling assembly 100 to facilitate its proper function, without departing from the scope of the disclosure.

The demulsifier composition can be added to the drilling fluid 122 via a mixing hopper 134 communicably coupled to or otherwise in fluid communication with the retention pit 132. The mixing hopper 134 can include mixers and related mixing equipment known to those skilled in the art. In other embodiments, however, the demulsifier composition can be added to the drilling fluid 122 at any other location in the drilling assembly 100. In at least one embodiment, for example, there could be more than one retention pit 132, such as multiple retention pits 132 in series. Moreover, the retention pit 132 can be representative of one or more fluid storage facilities and/or units where the demulsifier composition can be stored, reconditioned, and/or regulated until added to the drilling fluid 122.

As mentioned above, the demulsifier composition can directly or indirectly affect the components and equipment of the drilling assembly 100. For example, the demulsifier composition can directly or indirectly affect the fluid processing unit(s) 128, which can include one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 can further include one or more sensors, gauges, pumps, compressors, and the like used to store, monitor, regulate, and/or recondition the demulsifier composition.

The demulsifier composition can directly or indirectly affect the pump 120, which representatively includes any conduits, pipelines, trucks, tubulars, and/or pipes used to fluidically convey the demulsifier composition to the subterranean formation; any pumps, compressors, or motors (e.g., topside or downhole) used to drive the demulsifier composition into motion; any valves or related joints used to regulate the pressure or flow rate of the demulsifier composition; and any sensors (e.g., pressure, temperature, flow rate, and the like), gauges, and/or combinations thereof, and the like. The demulsifier composition can also directly or indirectly affect the mixing hopper 134 and the retention pit 132 and their assorted variations.

The demulsifier composition can also directly or indirectly affect the various downhole or subterranean equipment and tools that can come into contact with the demulsifier composition such as the drill string 108, any floats, drill collars, mud motors, downhole motors, and/or pumps associated with the drill string 108, and any measurement while drilling (MWD)/logging while drilling (LWD) tools and related telemetry equipment, sensors, or distributed sensors associated with the drill string 108. The demulsifier composition can also directly or indirectly affect any downhole heat exchangers, valves, and corresponding actuation devices, tool seals, packers, other wellbore isolation devices or components, and the like associated with the wellbore 116. The demulsifier composition can also directly or indirectly affect the drill bit 114, which can include roller cone bits, poly crystalline diamond compact (PDC) bits, natural diamond bits, hole openers, reamers, coring bits, and the like.

While not specifically illustrated herein, the demulsifier composition can also directly or indirectly affect any transport or delivery equipment used to convey the demulsifier composition to the drilling assembly 100 such as, for example, any transport vessels, conduits, pipelines, trucks, tubulars, and/or pipes used to fluidically move the demulsifier composition from one location to another; any pumps, compressors, or motors used to drive the demulsifier composition into motion; any valves or related joints used to regulate the pressure or flow rate of the demulsifier composition; and any sensors (e.g., pressure and temperature), gauges, and/or combinations thereof, and the like.

System or Apparatus.

In various embodiments, the present invention provides a system. The system can be any suitable system that can use or that can be generated by use of an embodiment of the demulsifier composition described herein in a subterranean formation, or that can perform or be generated by performance of a method for using the demulsifier composition described herein. The system can include a demulsifier composition, such as any demulsifier composition described herein. The system can also include a subterranean formation including the demulsifier composition therein. In some embodiments, the demulsifier composition in the system can also include a downhole fluid, or the system can include a mixture of the demulsifier composition and downhole fluid. In some embodiments, the system can include a tubular, and a pump configured to pump the demulsifier composition into the subterranean formation through the tubular.

In some embodiments, the system can include a tubular disposed in a subterranean formation. The system can also include a pump configured to pump a demulsifier composition in the subterranean formation through the tubular. The demulsifier composition can include an alkanolamide surfactant that is a $(C_1-C_{50})$hydrocarbyl amide having groups $R^1$ and $R^2$ substituted on the amide nitrogen, wherein $R^1$ and $R^2$ are each independently selected from the group consisting of —H, —$(C_1-C_{50})$hydrocarbyl, and —$(C_1-C_{50})$hydrocarbylene-OH, wherein at least one of $R^1$ and $R^2$ is —$(C_1-C_{50})$hydrocarbylene-OH. The demulsifier composition can include an alkoxylated alcohol surfactant that is a $(C_1-C_{50})$ hydrocarbyl-OH having a —$((C_2-C_3)$alkylene-O$)_n$—H group on the —OH group, wherein n is about 1 to about 100. The demulsifier composition can include an amine-oxide surface. At each occurrence the $(C_1-C_{50})$hydrocarbyl and $(C_1-C_{50})$hydrocarbylene are substituted or unsubstituted and are independently selected.

Various embodiments provide systems and apparatus configured for delivering the demulsifier composition described herein to a subterranean location and for using the demulsifier composition therein, such as for a drilling operation, or a fracturing operation (e.g., pre-pad, pad, slurry, or finishing stages). In various embodiments, the system or apparatus can include a pump fluidly coupled to a tubular (e.g., any suitable type of oilfield pipe, such as pipeline, drill pipe, production tubing, and the like), with the tubular containing the demulsifier composition.

In some embodiments, the system can include a drill string disposed in a wellbore, with the drill string including a drill bit at a downhole end of the drill string. The system can also include an annulus between the drill string and the wellbore. The system can also include a pump configured to circulate the demulsifier composition through the drill string, through the drill bit, and back above-surface through the annulus. In some embodiments, the system can include a fluid processing unit configured to process the demulsifier composition exiting the annulus to generate a cleaned drilling fluid for recirculation through the wellbore.

The pump can be a high pressure pump in some embodiments. As used herein, the term "high pressure pump" will refer to a pump that is capable of delivering a fluid to a subterranean formation (e.g., downhole) at a pressure of about 1000 psi or greater. A high pressure pump can be used when it is desired to introduce the demulsifier composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps will be known to one having ordinary skill in the art and can include floating piston pumps and positive displacement pumps.

In other embodiments, the pump can be a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey the demulsifier composition to the high pressure pump. In such embodiments, the low pressure pump can "step up" the pressure of the demulsifier composition before it reaches the high pressure pump.

In some embodiments, the systems or apparatuses described herein can further include a mixing tank that is upstream of the pump and in which the demulsifier composition is formulated. In various embodiments, the pump (e.g., a low pressure pump, a high pressure pump, or a combination thereof) can convey the demulsifier composition from the mixing tank or other source of the demulsifier composition to the tubular. In other embodiments, however, the demulsifier composition can be formulated offsite and transported to a worksite, in which case the demulsifier composition can be introduced to the tubular via the pump directly from its shipping container (e.g., a truck, a railcar, a barge, or the like) or from a transport pipeline. In either case, the demulsifier composition can be drawn into the pump, elevated to an appropriate pressure, and then introduced into the tubular for delivery to the subterranean formation.

Figure 2:
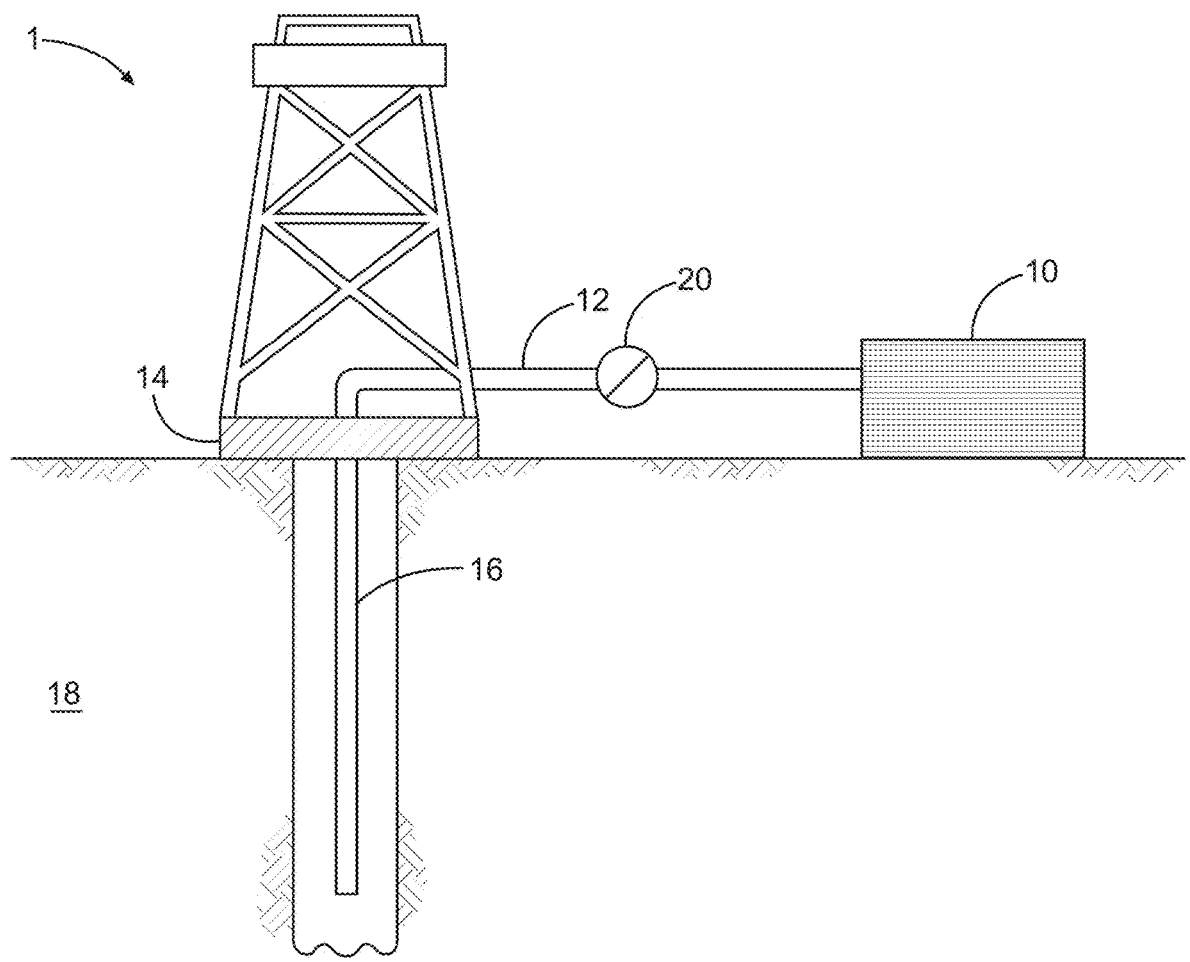
FIG. 2 illustrates a system or apparatus for delivering a composition to a subterranean formation, in accordance with various embodiments.

FIG. 2 shows an illustrative schematic of systems and apparatuses that can deliver embodiments of the demulsifier compositions of the present invention to a subterranean location, according to one or more embodiments. It should be noted that while FIG. 2 generally depicts a land-based system or apparatus, it is to be recognized that like systems and apparatuses can be operated in subsea locations as well. Embodiments of the present invention can have a different scale than that depicted in FIG. 2. As depicted in FIG. 2, system or apparatus 1 can include mixing tank 10, in which an embodiment of the demulsifier composition can be formulated. The demulsifier composition can be conveyed via line 12 to wellhead 14, where the demulsifier composition enters tubular 16, with tubular 16 extending from wellhead 14 into subterranean formation 18. Upon being ejected from tubular 16, the demulsifier composition can subsequently penetrate into subterranean formation 18. Pump 20 can be configured to raise the pressure of the demulsifier composition to a desired degree before its introduction into tubular 16. It is to be recognized that system or apparatus 1 is merely exemplary in nature and various additional components can be present that have not necessarily been depicted in FIG. 2 in the interest of clarity. In some examples, additional components that can be present include supply hoppers, valves, condensers, adapters, joints, gauges, sensors, compressors, pressure controllers, pressure sensors, flow rate controllers, flow rate sensors, temperature sensors, and the like.

Although not depicted in FIG. 2, at least part of the demulsifier composition can, in some embodiments, flow back to wellhead 14 and exit subterranean formation 18. In some embodiments, the demulsifier composition that has flowed back to wellhead 14 can subsequently be recovered, and in some examples reformulated, and recirculated to subterranean formation 18.

It is also to be recognized that the disclosed composition can also directly or indirectly affect the various downhole or subterranean equipment and tools that can come into contact with the demulsifier composition during operation. Such equipment and tools can include wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 2

Demulsifier Composition for Treatment of a Subterranean Formation or Produced Petroleum Including an Emulsion.

Various embodiments provide a demulsifier composition. In some embodiments, the demulsifier composition can be for treatment of a subterranean formation. In some embodiments, the demulsifier composition can be for treatment of oil produced from a subterranean formation. The demulsifier composition can be any suitable composition that can be used to perform an embodiment of the method for treatment of a subterranean formation described herein, or an embodiment of the method for treatment of produced petroleum including an emulsion described herein.

For example, the demulsifier composition can include an alkanolamide surfactant that is a ($C_1$-$C_{50}$)hydrocarbyl amide having groups $R^1$ and $R^2$ substituted on the amide nitrogen, wherein $R^1$ and $R^2$ are each independently selected from the group consisting of —H, —($C_1$-$C_{50}$)hydrocarbyl, and —($C_1$-$C_{50}$)hydrocarbylene-OH, wherein at least one of $R^1$ and $R^2$ is —($C_1$-$C_{50}$)hydrocarbylene-OH. The demulsifier composition can include an alkoxylated alcohol surfactant that is a ($C_1$-$C_{50}$)hydrocarbyl-OH having a —(($C_2$-$C_3$)alkylene-O)$_n$—H group on the —OH group, wherein n is about 1 to about 100. The demulsifier composition can also include an amine-oxide surfactant. At each occurrence the ($C_1$-$C_{50}$)hydrocarbyl and ($C_1$-$C_{50}$)hydrocarbylene can be substituted or unsubstituted and are independently selected.

In some embodiments, the present invention provides a composition that is a mixture of a downhole fluid and the demulsifier composition. For example, a downhole fluid can include the demulsifier composition. For example, a hydraulic fracturing fluid can include the demulsifier composition.

In some embodiments, the demulsifier composition can include an aqueous phase. The demulsifier composition can include an oil phase, wherein the demulsifier composition includes an emulsion including the aqueous phase and the oil phase. The demulsifier composition can include an alkanolamide surfactant that has the structure:

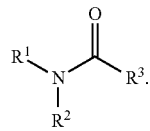

The variable $R^3$ can be a substituted or unsubstituted ($C_{12}$-$C_{25}$)hydrocarbyl of a tall oil fatty acid having the structure $R^3$—C(O)—OH. The variables $R^1$ and $R^2$ can be each independently —($C_1$-$C_{10}$)alkylene-OH. The demulsifier composition can include an alkoxylated alcohol surfactant that is a ($C_{10}$-$C_{20}$)hydrocarbon including a secondary alcohol group, wherein the ($C_{10}$-$C_{20}$)hydrocarbon is otherwise unsubstituted, wherein the secondary alcohol group includes a —($CH_2$—$CH_2$—O)$_{5\text{-}10}$—H group thereon. The demulsifier composition can include an amine-oxide surfactant having the structure:

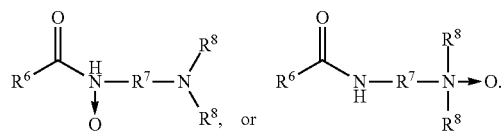

The variable $R^6$ can be ($C_{11}$-$C_{13}$)alkyl. The variable $R^7$ can be ($C_1$-$C_5$)alkylene. At each occurrence, $R^8$ can be independently ($C_1$-$C_5$)alkyl.

In various embodiments, the demulsifier composition includes an aqueous phase that can be about 10 wt % to about 80 wt % of the demulsifier composition. The demulsifier composition can include an oil phase that can be about 10 wt % to about 80 wt % of the demulsifier composition, wherein the demulsifier composition includes an emulsion including the aqueous phase and the oil phase. The demulsifier composition can include a ($C_1$-$C_5$)alkyl alcohol that can be about 5 wt % to about 30 wt % of the demulsifier composition. The demulsifier composition can include an alkanolamide surfactant that can be about 5 wt % to about 40 wt % of the demulsifier composition, wherein the alkanolamide surfactant has the structure:

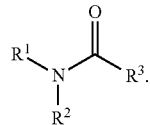

The variable $R^3$ can be a substituted or unsubstituted ($C_{15}$-$C_{17}$)hydrocarbyl of a tall oil fatty acid having the structure $R^3$—C(O)—OH. The variables $R^1$ and $R^2$ can be each —$CH_2$—$CH_2$—OH. The demulsifier composition can include an alkoxylated alcohol surfactant that can be about 5 wt % to about 40 wt % of the demulsifier composition, wherein the alkoxylated alcohol surfactant is a ($C_{15}$)hydrocarbon including a secondary alcohol group, wherein the ($C_{15}$)hydrocarbon is otherwise unsubstituted, wherein the secondary alcohol group includes a —($CH_2$—$CH_2$—O)$_7$—H group thereon. The demulsifier composition can include an amine-oxide surfactant that can be about 0.01 wt % to about 20 wt % of the demulsifier composition, wherein the amine-oxide surfactant can have the structure:

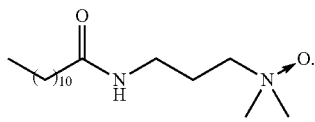

The demulsifier composition can also include an amine-oxide surfactant that can be about 0.01 wt % to about 20 wt % of the demulsifier composition, wherein the amine-oxide surfactant can have the structure:

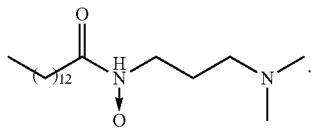

Method for Preparing a Demulsifier Composition for Treatment of a Subterranean Formation or of Produced Petroleum Including an Emulsion.

In various embodiments, the present invention provides a method for preparing a demulsifier composition for treatment of a subterranean formation or of produced petroleum including an emulsion. The method can be any suitable method that produces an embodiment of the demulsifier composition described herein. For example, the method can include forming a demulsifier composition including an alkanolamide surfactant that is a $(C_1\text{-}C_{50})$hydrocarbyl amide having groups $R^1$ and $R^2$ substituted on the amide nitrogen, wherein $R^1$ and $R^2$ are each independently selected from the group consisting of —H, —$(C_1\text{-}C_{50})$hydrocarbyl, and —$(C_1\text{-}C_{50})$hydrocarbylene-OH, wherein at least one of $R^1$ and $R^2$ is —$(C_1\text{-}C_{50})$hydrocarbylene-OH. The demulsifier can include an alkoxylated alcohol surfactant that is a $(C_1\text{-}C_{50})$hydrocarbyl-OH having a —$((C_2\text{-}C_3)\text{alkylene-O})_n$—H group on the —OH group, wherein n is about 1 to about 100. The demulsifier composition can also include an amine-oxide surfactant. At each occurrence the $(C_1\text{-}C_{50})$hydrocarbyl and $(C_1\text{-}C_{50})$hydrocarbylene are substituted or unsubstituted and are independently selected.

EXAMPLES

Various embodiments of the present invention can be better understood by reference to the following Examples, which are offered by way of illustration. The present invention is not limited to the Examples given herein.

Example 1. Formation of Sample Compositions

Two sample compositions were formed, Sample 1 and Sample 2, according to Table 1. Sample 1 was a microemulsion with an inner oil phase and an outer water phase, with the droplets of the inner oil phase having a size of 10 nm to 150 nm. Sample 2 has the same composition as Sample 1, but lacked the oil phase and was not an emulsion.

TABLE 1

| Ingredients | Category | Sample 1 | Sample 2 |
|---|---|---|---|
| De-ionized water | Water | 30% | 60% |
| Escaid ™ PathFrac ™ fluid | Oil | 30% | 0% |

TABLE 1-continued

| Ingredients | Category | Sample 1 | Sample 2 |
|---|---|---|---|
| iso-propanol | Co-solvent | 10% | 10% |
| Tergitol ™ 15-S-7 surfactant | Secondary alcohol ethyoxylate | 10% | 10% |
| Amadol ® 511 surfactant | Alkanolamide | 10% | 10% |
| Ammonyx ® LMDO surfactant | Amine-oxide | 10% | 10% |
| Total | | 100% | 100% |

Example 2, Comparison of Properties of Sample Compositions and Other Demulsifier Compositions Properties of Sample 1 from Example 1, GasPerm 1000™ surfactant blend, and LoSurf-300D™ surfactant blend were compared.

RockPerm$^{SM}$ Gas Values.

RockPerm$^{SM}$ Gas values were determined by performing the following procedure. A plastic column was filled with sand. The dry weight of the sand was obtained. Formation water (8 mL, 7% KCl) was added, and gravity was allowed to pull the formation water into the column. Demulsifier composition (12 mL) was added, and gravity was allowed to pull the demulsifier composition into the column. The wet weight of the column was obtained. Pore volume was calculated using the expression: pore volume=wet weight of column−dry weight of column (assuming the density of water). Positive gas pressure was placed on the top of the column. All of the treatment fluid that was displaced from the column was captured in a flask over a tared balance. The wt % fluid displaced is calculated based on the weight of the fluid displaced from the column. The pressure across the sandpack was monitored. The RockPerm$^{SM}$ Gas value was calculated as: wt % fluid displaced/maximum pressure measured (psig).

RockPerm$^{SM}$ Values.

RockPerm$^{SM}$ values were determined by performing the following procedure. A glass column was provided. The hosecock (stopper) on the column was closed. Formation water (10 mL, 7% KCl) was added to the column. Proppant (100 mesh sand, 10 g) was slowly added to the formation water. The column was vibrated for 10 seconds to pack the sand. The hosecock was opened and the formation water was allowed to flow until the meniscus reached the top of the sand bed. The pore volume (PV) of the sand bed was measured by measuring the volume of water in the sand bed. The proppant was treated with 3 pore volumes (3 PV) of a broken fracturing fluid (7% KCl) containing 2 gpt (gallons per thousand gallons) of the demulsifier composition. The broken fracturing fluid was drained from the column until the meniscus reached the top of the sand bed. The hosecock of the column was closed. Formation oil was added to the 15 mL mark (wherein the 0 mL mark is at the bottom of the column). The hosecock was opened, and the fracturing fluid displaced by the oil was collected over time. The experiment was stopped when the formation oil broke through the sand bed or at the 2 h mark, whichever happened first. The time the oil broke through was called the breakthrough time (BTT). The weight of the fracturing fluid displaced at the BTT or at the 2 h mark (if the oil did not breakthrough) was measured. The RockPerm$^{SM}$ Value (RPV) was estimated as RPV=(weight of fluid displaced (g)/BTT (h))*(weight of fluid displaced (g)/PV (mL)).

Emulsion Break Test.

The emulsion break test was performed by performing the following procedure. Fracturing fluid (5 mL) was added to a graduated cylinder. The fracturing fluid was spiked with 2 gal/1000 gal of surfactant, the cylinder was capped, and the cylinder was inverted. Formation oil (5 mL) was carefully added on top of the fluid. The cylinder was re-capped and was inverted 10 times. The cylinder was set on a lab bench and a timer was started. The volume of the separated fluid was recorded at 1, 5, and 10 minutes at ambient temperature. If 100% separation was not achieved, the sample was placed at 180° F. (82.2° C.) and the volume of the separated fluid was recorded at 1, 5, and 10 minutes at the elevated temperature.

The measured properties of Sample 1 from Example 1, GasPerm 1000™ surfactant blend, and LoSurf-300D™ surfactant blend are shown in Table 2.

TABLE 2

| Ingredients | Sample 1 | Sample 2 | GasPerm 1000 ™ surfactant blend | LoSurf-300D ™ surfactant blend |
|---|---|---|---|---|
| Type | Microemulsion | Conventional (non-emulsion) | Microemulsion | Conventional (non-emulsion) |
| Stability | Stable | Stable | Stable | Stable |
| Solubility in 7% KCl | Slightly insoluble | Slightly insoluble | Stable | Slightly insoluble |
| High temperature stability (93° C.) | Stable | Stable | Stable | Stable |
| Low temperature stability (<−10° C.) | Stable | Stable | Stable | Stable |
| RockPerm ℠ Gas (RPG, 7% KCl) | 80 | Not measured | 50 | 60 |
| RockPerm ℠ Value (RPV, 7% KCl) | 61.54 | 32.6 | 2 | 20 |
| Emulsion break test, H₂O | <5 min at rt | Not measured | >10 min at rt; breaks at 93° C. | <5 min at rt |
| Emulsion break test, 7% KCl | <5 min at rt | Not measured | >10 min at rt; breaks at 93° C. | <5 min at rt |

Figure 3A:
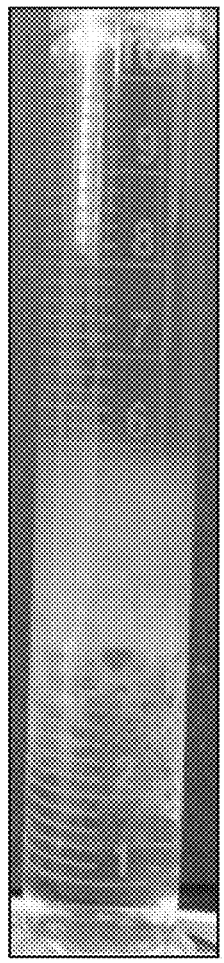
FIGS. 3A-C illustrate photographs of an emulsion break test performed on a demulsifier composition at room temperature at 1 minute (FIG. 3A), 5 minutes (FIG. 3B), and at 10 minutes (FIG. 3C), in accordance with various embodiments.
Figure 3B:
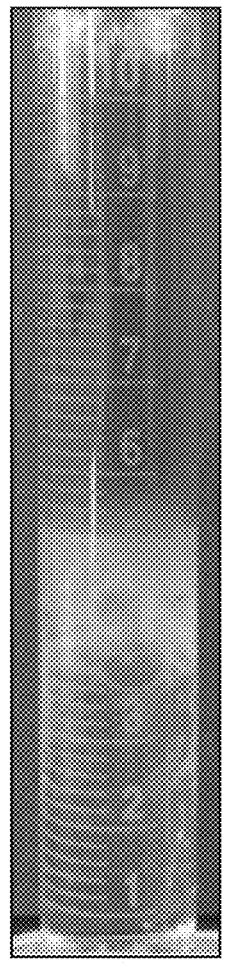
Figure 3C:
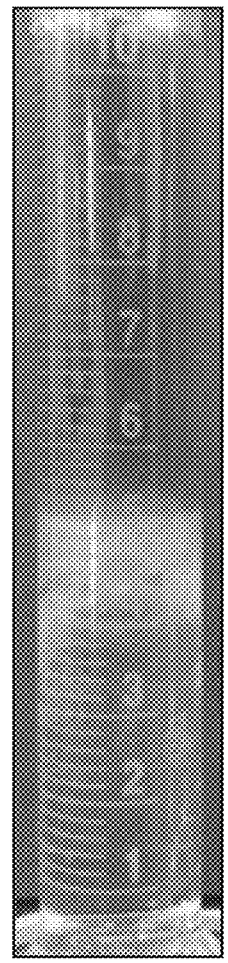

FIGS. 3A-C illustrate photographs of the emulsion break test performed on Sample 1 from Example 1 at room temperature at 1 minute (FIG. 3A), 5 minutes (FIG. 3B), and at 10 minutes (FIG. 3C).

Figure 4A:
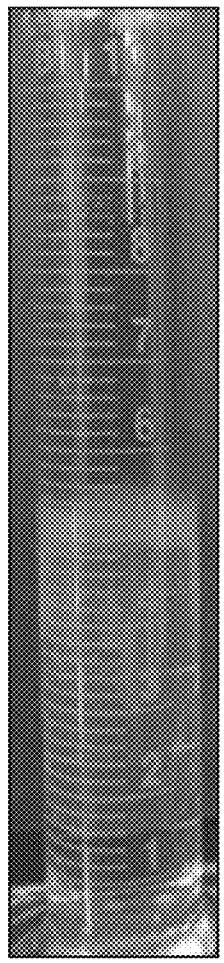
FIGS. 4A-C illustrate photographs of an emulsion break test performed on a demulsifier composition at 93° C. at 1 minute (FIG. 4A), 5 minutes (FIG. 4B), and at 10 minutes (FIG. 4C), in accordance with various embodiments.
Figure 4B:
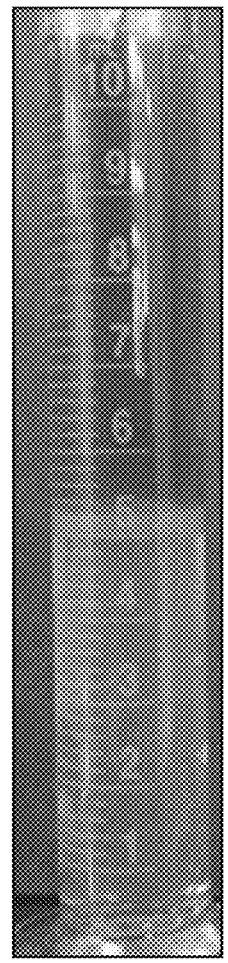
Figure 4C:
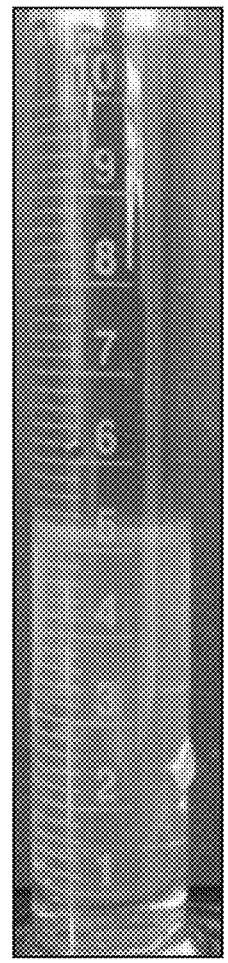

FIGS. 4A-C illustrate photographs of the emulsion break test performed on Sample 1 from Example 1 at 93° C. at 1 minute (FIG. 4A), 5 minutes (FIG. 4B), and at 10 minutes (FIG. 4C).

Figure 5A:
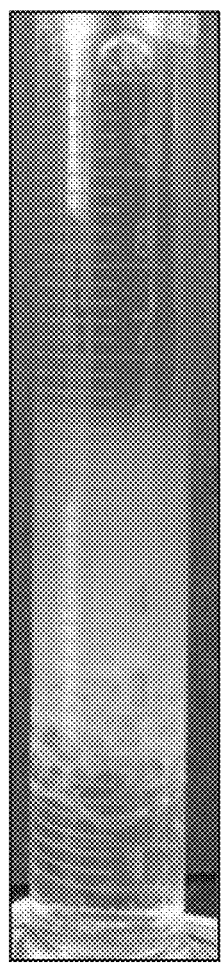
FIGS. 5A-C illustrate photographs of an emulsion break test performed on a demulsifier composition at room temperature at 1 minute (FIG. 5A), 5 minutes (FIG. 5B), and at 10 minutes (FIG. 5C), in accordance with various embodiments.
Figure 5B:
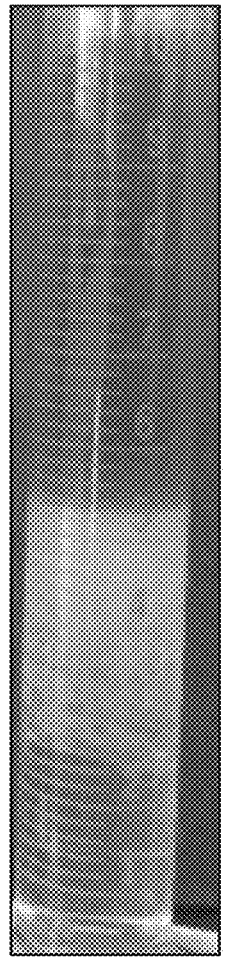
Figure 5C:
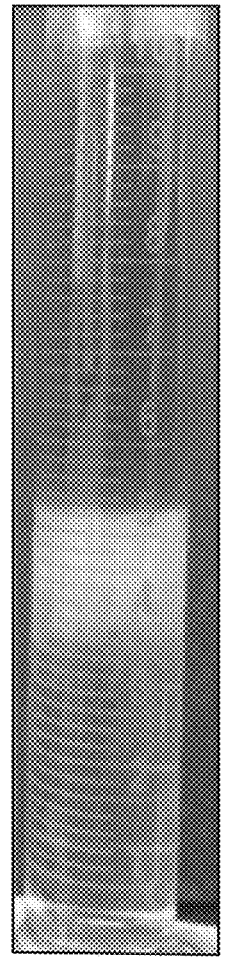

FIGS. 5A-C illustrate photographs of the emulsion break test performed on Sample 2 from Example 1 at room temperature at 1 minute (FIG. 5A), 5 minutes (FIG. 5B), and at 10 minutes (FIG. 5C).

Figure 6A:
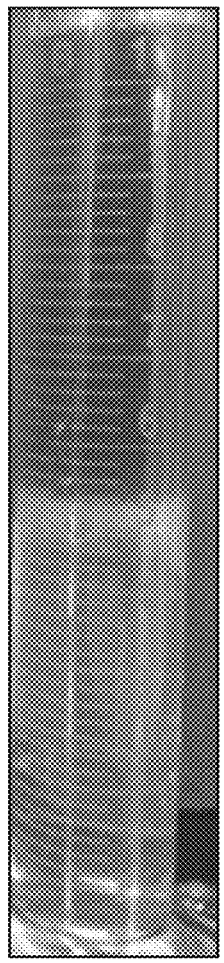
FIGS. 6A-C illustrate photographs of an emulsion break test performed on a demulsifier composition at 93° C. at 1 minute (FIG. 6A), 5 minutes (FIG. 6B), and at 10 minutes (FIG. 6C), in accordance with various embodiments.
Figure 6B:
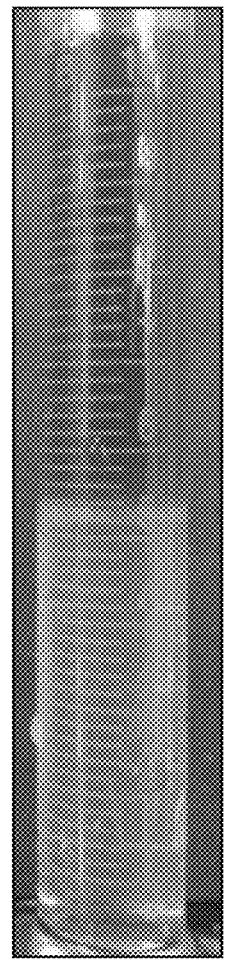
Figure 6C:
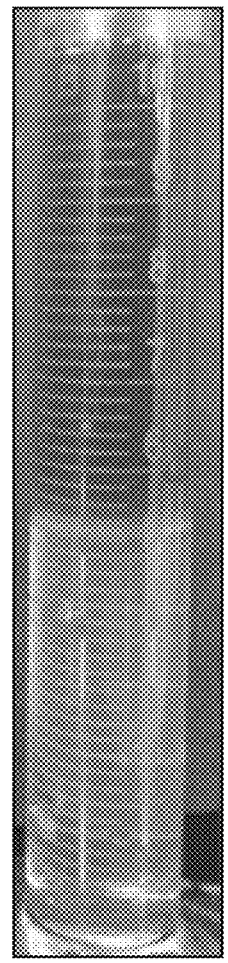

FIGS. 6A-C illustrate photographs of the emulsion break test performed on Sample 2 from Example 1 at 93° C. at 1 minute (FIG. 6A), 5 minutes (FIG. 6B), and at 10 minutes (FIG. 6C).

Figure 7A:
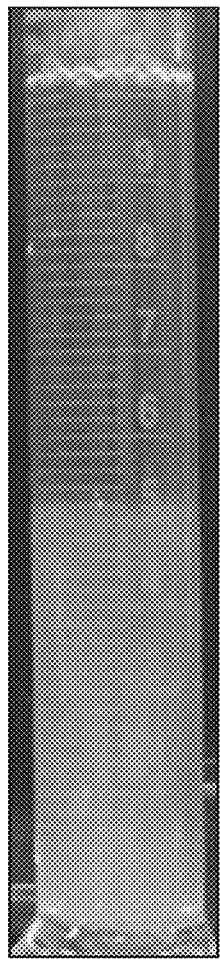
FIGS. 7A-C illustrate photographs of an emulsion break test performed on a demulsifier composition at room temperature at 1 minute (FIG. 7A), 5 minutes (FIG. 7B), and at 10 minutes (FIG. 7C), in accordance with various embodiments.
Figure 7B:
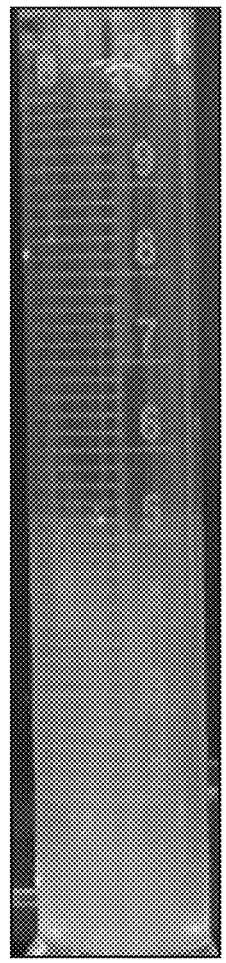
Figure 7C:
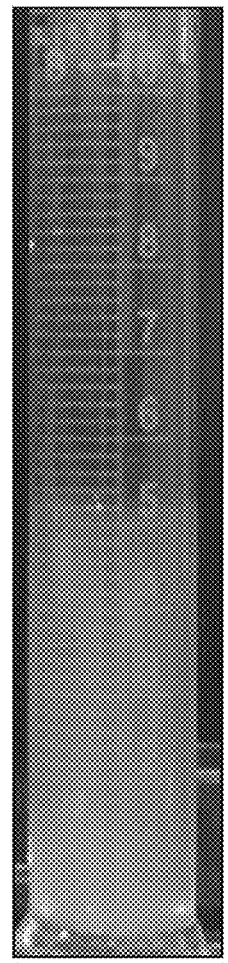

FIGS. 7A-C illustrate photographs of the emulsion break test performed on Sample 1 from Example 1 at room temperature 7% KCl at 1 minute (FIG. 7A), 5 minutes (FIG. 7B), and at 10 minutes (FIG. 7C).

Figure 8A:
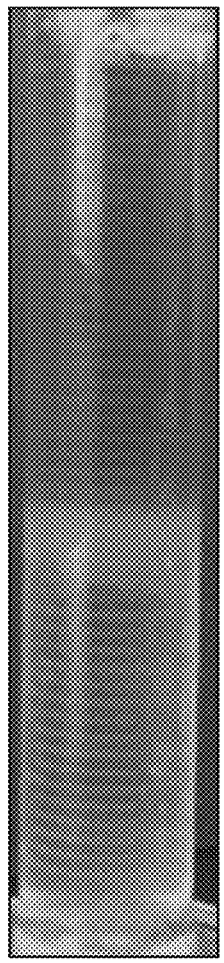
FIGS. 8A-C illustrate photographs of an emulsion break test performed on a demulsifier composition at room temperature at 1 minute (FIG. 8A), 5 minutes (FIG. 8B), and at 10 minutes (FIG. 8C), in accordance with various embodiments.
Figure 8B:
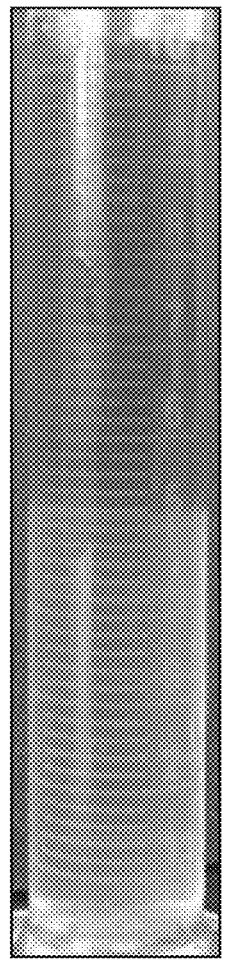
Figure 8C:
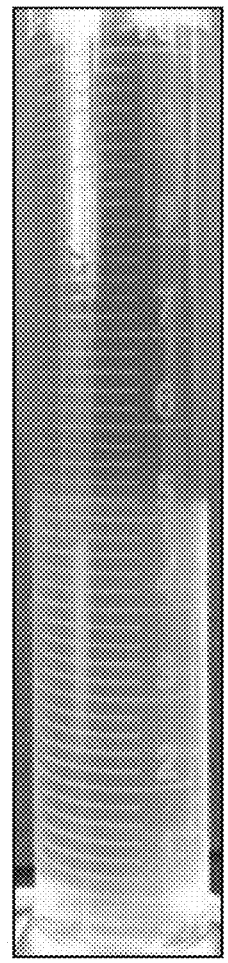

FIGS. 8A-C illustrate photographs of the emulsion break test performed on Sample 2 from Example 1 at room temperature using 7% KCl at 1 minute (FIG. 8A), 5 minutes (FIG. 8B), and at 10 minutes (FIG. 8C).

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

ADDITIONAL EMBODIMENTS

The following exemplary embodiments are provided, the numbering of which is not to be construed as designating levels of importance:

Embodiment 1 provides a method of treating a subterranean formation, the method comprising:
placing in the subterranean formation a demulsifier composition comprising:
an alkanolamide surfactant that is a $(C_1$-$C_{50})$hydrocarbyl amide having groups $R^1$ and $R^2$ substituted on the amide nitrogen, wherein $R^1$ and $R^2$ are each independently selected from the group consisting of —H, —$(C_1$-$C_{50})$hydrocarbyl, and —$(C_1$-$C_{50})$hydrocarbylene-OH, wherein at least one of $R^1$ and $R^2$ is —$(C_1$-$C_{50})$hydrocarbylene-OH;
an alkoxylated alcohol surfactant that is a $(C_1$-$C_{50})$hydrocarbyl-OH having a —$((C_2$-$C_3)$alkylene-O$)_n$—H group on the —OH group, wherein n is about 1 to about 100; and
an amine-oxide surfactant;
wherein at each occurrence the $(C_1$-$C_{50})$hydrocarbyl and $(C_1$-$C_{50})$hydrocarbylene are substituted or unsubstituted and are independently selected.

Embodiment 2 provides the method of Embodiment 1, wherein a subterranean treatment fluid comprises the demulsifier composition, wherein the subterranean treatment fluid is a stimulation fluid, a hydraulic fracturing fluid, a drilling fluid, a spotting fluid, a clean-up fluid, a completion fluid, a remedial treatment fluid, an abandonment fluid, a pill, an acidizing fluid, a cementing fluid, a packer fluid, a logging fluid, or a combination thereof.

Embodiment 3 provides the method of any one of Embodiments 1-2, wherein the method comprises performing a subterranean formation treatment operation in the subterranean formation comprising hydraulic fracturing, stimulation, drilling, spotting, clean-up, completion, remedial treatment, abandonment, acidizing, cementing, packing, logging, or a combination thereof.

Embodiment 4 provides the method of any one of Embodiments 1-3, wherein a subterranean treatment fluid comprises the demulsifier composition, wherein the subterranean treatment fluid comprises a hydraulic fracturing fluid.

Embodiment 5 provides the method of any one of Embodiments 1-4, wherein the method comprises hydraulically fracturing the subterranean formation with the demulsifier composition or with a subterranean treatment fluid comprising the demulsifier composition.

Embodiment 6 provides the method of any one of Embodiments 1-5, wherein the method further comprises obtaining or providing the demulsifier composition, wherein the obtaining or providing of the demulsifier composition occurs above-surface.

Embodiment 7 provides the method of any one of Embodiments 1-6, wherein the method further comprises obtaining or providing the demulsifier composition, wherein the obtaining or providing of the demulsifier composition occurs in the subterranean formation.

Embodiment 8 provides the method of any one of Embodiments 1-7, further comprising reducing or eliminating an emulsion in the subterranean formation Embodiment 9 provides the method of any one of Embodiments 1-8, further comprising reducing or eliminating formation of an emulsion in the subterranean formation.

Embodiment 10 provides the method of any one of Embodiments 1-9, wherein the demulsifier composition further comprises a water phase.

Embodiment 11 provides the method of Embodiment 10, wherein the water is about 0.01 wt % to about 99.99 wt % of the demulsifier composition.

Embodiment 12 provides the method of any one of Embodiments 10-11, wherein the water is about 10 wt % to about 80 wt % of the demulsifier composition.

Embodiment 13 provides the method of any one of Embodiments 1-12, wherein the demulsifier composition further comprises an organic solvent.

Embodiment 14 provides the method of Embodiment 13, wherein the organic solvent is about 0.01 wt % to about 99.99 wt % of the demulsifier composition.

Embodiment 15 provides the method of any one of Embodiments 13-14, wherein the organic solvent is about 5 wt % to about 30 wt % of the demulsifier composition.

Embodiment 16 provides the method of any one of Embodiments 13-15, wherein the organic solvent is a water-miscible organic solvent.

Embodiment 17 provides the method of any one of Embodiments 13-16, wherein the organic solvent is a substituted or unsubstituted $(C_1-C_{20})$hydrocarbyl alcohol.

Embodiment 18 provides the method of any one of Embodiments 13-17, wherein the organic solvent is a $(C_1-C_5)$alkyl alcohol.

Embodiment 19 provides the method of any one of Embodiments 13-18, wherein the organic solvent is ethanol, iso-propanol, n-propanol, n-butanol, s-butanol, t-butanol, n-pentanol, a pentanol isomer, or a combination thereof.

Embodiment 20 provides the method of any one of Embodiments 1-19, wherein the demulsifier composition further comprises an oil phase.

Embodiment 21 provides the method of any one of Embodiments 1-20, wherein the oil phase is about 0.01 wt % to about 99.99 wt % of the demulsifier composition.

Embodiment 22 provides the method of any one of Embodiments 1-21, wherein the oil phase is about 10 wt % to about 80 wt % of the demulsifier composition.

Embodiment 23 provides the method of any one of Embodiments 1-22, wherein the oil phase comprises hydrotreated light petroleum distillates having a boiling point range greater than about 200° C. and less than about 250° C.

Embodiment 24 provides the method of any one of Embodiments 1-23, wherein the demulsifier composition comprises both an aqueous phase and an oil phase.

Embodiment 25 provides the method of Embodiment 24, wherein the demulsifier composition comprises an emulsion comprising the aqueous phase and the oil phase.

Embodiment 26 provides the method of Embodiment 25, wherein the aqueous phase is the outer phase and the oil phase is the inner phase.

Embodiment 27 provides the method of any one of Embodiments 25-26, wherein the oil phase is the outer phase and the aqueous phase is the inner phase.

Embodiment 28 provides the method of any one of Embodiments 25-27, wherein the emulsion becomes unstable upon dilution with water.

Embodiment 29 provides the method of any one of Embodiments 25-28, wherein the emulsion is unstable at a concentration of 0.2 wt % in water.

Embodiment 30 provides the method of any one of Embodiments 25-29, wherein the emulsion is unstable at a concentration of 0.2 wt % in brine.

Embodiment 31 provides the method of any one of Embodiments 25-30, wherein the emulsion is unstable at a concentration of 0.2 wt % in water comprising 7 wt % KCl.

Embodiment 32 provides the method of any one of Embodiments 25-31, wherein the emulsion is a microemulsion.

Embodiment 33 provides the method of any one of Embodiments 1-32, wherein the alkanolamide surfactant is about 1 wt % to about 90 wt % of the demulsifier composition.

Embodiment 34 provides the method of any one of Embodiments 1-33, wherein the alkanolamide surfactant is about 5 wt % to about 40 wt % of the demulsifier composition.

Embodiment 35 provides the method of any one of Embodiments 1-34, wherein the alkanolamide surfactant has the structure:

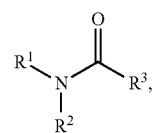

wherein $R^3$ is the $(C_1-C_{50})$hydrocarbyl group.

Embodiment 36 provides the method of Embodiment 35, wherein the alkanolamide surfactant is an alkanolamide of a tall oil fatty acid.

Embodiment 37 provides the method of any one of Embodiments 35-36, wherein the $(C_1-C_{50})$hydrocarbyl groups and the —$(C_1-C_{50})$hydrocarbylene-OH group of the alkanolamide surfactant are unsubstituted.

Embodiment 38 provides the method of any one of Embodiments 35-37, wherein $R^3$ is a substituted or unsubstituted $(C_{12}-C_{25})$hydrocarbyl.

Embodiment 39 provides the method of any one of Embodiments 35-38, wherein $R^3$ is a substituted or unsubstituted $(C_{15}-C_{17})$hydrocarbyl.

Embodiment 40 provides the method of any one of Embodiments 35-39, the alkanolamide surfactant is the alkanolamide of a tall oil fatty acid having the structure $R^3$—C(O)—OH.

Embodiment 41 provides the method of any one of Embodiments 1-40, wherein the alkanolamide surfactant is a tall oil $(C_{16}-C_{18})$fatty acid alkanolamide.

Embodiment 42 provides the method of any one of Embodiments 35-41, wherein both of $R^1$ and $R^2$ are independently —$(C_1-C_{50})$hydrocarbylene-OH.

Embodiment 43 provides the method of any one of Embodiments 35-42, wherein one of $R^1$ and $R^2$ are independently —$(C_1-C_{50})$hydrocarbylene-OH.

Embodiment 44 provides the method of any one of Embodiments 35-43, wherein $R^1$ and $R^2$ are independently selected from —H, substituted or unsubstituted $(C_1-C_{10})$hydrocarbyl, and substituted or unsubstituted —$(C_1-C_{10})$hydrocarbylene-OH.

Embodiment 45 provides the method of any one of Embodiments 35-44, wherein $R^1$ and $R^2$ are independently selected from —H, —$(C_1-C_5)$alkyl, and —$(C_1-C_5)$alkylene-OH.

Embodiment 46 provides the method of any one of Embodiments 35-45, wherein $R^1$ and $R^2$ are each —$CH_2$—$CH_2$—OH.

Embodiment 47 provides the method of any one of Embodiments 1-46, wherein the alkanolamide surfactant has the structure:

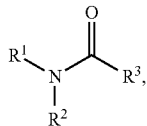

wherein $R^3$ is a substituted or unsubstituted $(C_{15}-C_{17})$ hydrocarbyl of a tall oil fatty acid having the structure $R^3$—C(O)—OH, and $R^1$ and $R^2$ are each —$CH_2$—$CH_2$—OH.

Embodiment 48 provides the method of any one of Embodiments 1-47, wherein the alkoxylated alcohol surfactant is about 1 wt % to about 90 wt % of the demulsifier composition.

Embodiment 49 provides the method of any one of Embodiments 1-48, wherein the alkoxylated alcohol surfactant is about 5 wt % to about 40 wt % of the demulsifier composition.

Embodiment 50 provides the method of any one of Embodiments 1-49, wherein the alkoxylated alcohol surfactant has the structure:

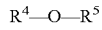

wherein
$R^4$ is the $(C_1-C_{50})$hydrocarbyl group, and
$R^5$ is the —$((C_2-C_3)$alkylene-O$)_n$—H group.

Embodiment 51 provides the method of Embodiment 50, wherein the alcohol is a secondary alcohol.

Embodiment 52 provides the method of any one of Embodiments 50-51, wherein the oxygen atom is bound to $R^4$ at a carbon atom having two other carbon atoms bound thereto in $R^4$.

Embodiment 53 provides the method of any one of Embodiments 50-52, wherein $R^4$ is unsubstituted aside from the alcohol.

Embodiment 54 provides the method of any one of Embodiments 50-53, wherein $R^4$ is a $(C_5-C_{25})$hydrocarbyl group.

Embodiment 55 provides the method of any one of Embodiments 50-54, wherein $R^4$ is a $(C_{10}-C_{20})$hydrocarbyl group.

Embodiment 56 provides the method of any one of Embodiments 50-55, wherein $R^4$ is a $(C_{15})$hydrocarbyl group.

Embodiment 57 provides the method of any one of Embodiments 50-56, wherein $R^5$ is a -(ethylene-O)$_n$—H group.

Embodiment 58 provides the method of any one of Embodiments 50-57, wherein n is about 2 to about 20.

Embodiment 59 provides the method of any one of Embodiments 50-58, wherein n is about 5 to about 10.

Embodiment 60 provides the method of any one of Embodiments 50-59, wherein n is about 7.

Embodiment 61 provides the method of any one of Embodiments 50-60, wherein $R^5$ is a -(ethylene-O)$_7$—H group.

Embodiment 62 provides the method of any one of Embodiments 1-61, wherein the alkoxylated alcohol surfactant is a $(C_{15})$hydrocarbon comprising a secondary alcohol group, wherein the $(C_{15})$hydrocarbon is otherwise unsubstituted, wherein the secondary alcohol group comprises a —$(CH_2-CH_2-O)_7$—H group thereon.

Embodiment 63 provides the method of any one of Embodiments 1-62, wherein the amine-oxide surfactant is about 0.01 wt % to about 90 wt % of the demulsifier composition.

Embodiment 64 provides the method of any one of Embodiments 1-63, wherein the amine-oxide surfactant is about 0.01 wt % to about 20 wt % of the demulsifier composition.

Embodiment 65 provides the method of any one of Embodiments 1-64, wherein the amine-oxide surfactant has the structure:

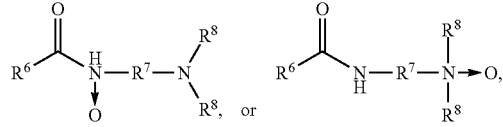

wherein
$R^6$ is substituted or unsubstituted $(C_1-C_{50})$hydrocarbyl,
$R^7$ is substituted or unsubstituted $(C_1-C_{20})$hydrocarbylene, and
at each occurrence, $R^8$ is independently substituted or unsubstituted $(C_1-C_{20})$hydrocarbyl.

Embodiment 66 provides the method of Embodiment 65, wherein $R^6$ is $(C_5-C_{30})$hydrocarbyl.

Embodiment 67 provides the method of any one of Embodiments 65-66, wherein $R^6$ is $(C_5-C_{20})$alkyl.

Embodiment 68 provides the method of any one of Embodiments 65-67, wherein $R^6$ is $(C_{11}-C_{13})$alkyl.

Embodiment 69 provides the method of any one of Embodiments 65-68, wherein $R^7$ is a $(C_1-C_{10})$hydrocarbylene.

Embodiment 70 provides the method of any one of Embodiments 65-69, wherein $R^7$ is a $(C_1-C_5)$alkylene.

Embodiment 71 provides the method of any one of Embodiments 65-70, wherein $R^7$ is propylene.

Embodiment 72 provides the method of any one of Embodiments 65-71, wherein $R^8$ is $(C_1-C_5)$alkyl.

Embodiment 73 provides the method of any one of Embodiments 65-72, wherein at each occurrence, $R^8$ is methyl.

Embodiment 74 provides the method of any one of Embodiments 1-73, wherein the amine-oxide surfactant has the structure:

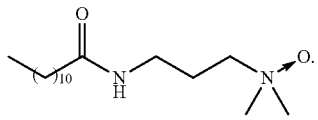

Embodiment 75 provides the method of any one of Embodiments 1-74, wherein the amine-oxide surfactant has the structure:

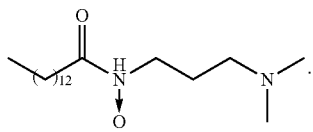

Embodiment 76 provides the method of any one of Embodiments 1-75, wherein the amine-oxide surfactant has the structure:

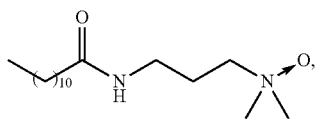

wherein the demulsifier composition further comprises another amine-oxide surfactant having the structure:

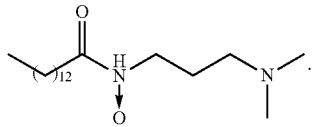

Embodiment 77 provides the method of any one of Embodiments 1-76, wherein the demulsifier composition further comprises base, acid, alcohol or polyol, cellulose, starch, alkalinity control agent, acidity control agent, density control agent, density modifier, emulsifier, dispersant, polymeric stabilizer, polyacrylamide, polymer or combination of polymers, antioxidant, heat stabilizer, foam control agent, solvent, diluent, plasticizer, filler or inorganic particle, pigment, dye, precipitating agent, oil-wetting agent, set retarding additive, corrosion inhibitor, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, disproportionate permeability modifier, relative permeability modifier, polymer, oxidizer, a marker, or a combination thereof.

Embodiment 78 provides the method of any one of Embodiments 1-77, wherein the placing of the demulsifier composition in the subterranean formation comprises fracturing at least part of the subterranean formation to form at least one subterranean fracture.

Embodiment 79 provides the method of any one of Embodiments 1-78, wherein the demulsifier composition further comprises a proppant, a resin-coated proppant, or a combination thereof.

Embodiment 80 provides the method of any one of Embodiments 1-79, wherein the placing of the demulsifier composition in the subterranean formation comprises pumping the demulsifier composition through a tubular disposed in a wellbore and into the subterranean formation.

Embodiment 81 provides a system for performing the method of any one of Embodiments 1-80, the system comprising:
a tubular disposed in the subterranean formation; and
a pump configured to pump the demulsifier composition in the subterranean formation through the tubular.

Embodiment 82 provides the method of any one of Embodiments 1-80, further comprising combining the demulsifier composition with an aqueous or oil-based fluid comprising a drilling fluid, stimulation fluid, fracturing fluid, spotting fluid, clean-up fluid, completion fluid, remedial treatment fluid, abandonment fluid, pill, acidizing fluid, cementing fluid, packer fluid, logging fluid, or a combination thereof, to form a mixture, wherein the placing the demulsifier composition in the subterranean formation comprises placing the mixture in the subterranean formation.

Embodiment 83 provides the method of any one of Embodiments 1-80 or 82, wherein at least one of prior to, during, and after the placing of the demulsifier composition in the subterranean formation, the demulsifier composition is used in the subterranean formation, at least one of alone and in combination with other materials, as a drilling fluid, stimulation fluid, fracturing fluid, spotting fluid, clean-up fluid, completion fluid, remedial treatment fluid, abandonment fluid, pill, acidizing fluid, cementing fluid, packer fluid, logging fluid, or a combination thereof.

Embodiment 84 provides a method of treating a subterranean formation, the method comprising:
placing in the subterranean formation a demulsifier composition comprising
an aqueous phase;
an oil phase, wherein the demulsifier composition comprises an emulsion comprising the aqueous phase and the oil phase;
an alkanolamide surfactant that has the structure:

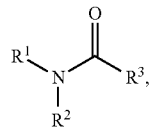

wherein $R^3$ is a substituted or unsubstituted $(C_{12}-C_{25})$ hydrocarbyl of a tall oil fatty acid having the structure $R^3$—C(O)—OH, and
$R^1$ and $R^2$ are each independently —$(C_1-C_{10})$alkylene-OH;
an alkoxylated alcohol surfactant that is a $(C_{10}-C_{20})$ hydrocarbon comprising a secondary alcohol group, wherein the $(C_{10}-C_{20})$hydrocarbon is otherwise unsubstituted, wherein the secondary alcohol group comprises a —(CH$_2$—CH$_2$—O)$_{5-10}$—H group thereon; and
an amine-oxide surfactant having the structure:

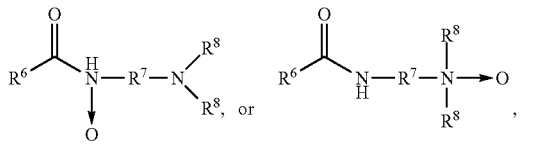

wherein
R$^6$ is (C$_{11}$-C$_{13}$)alkyl,
R$^7$ is (C$_1$-C$_5$)alkylene, and
at each occurrence, R$^8$ is independently (C$_1$-C$_5$)alkyl.

Embodiment 85 provides a method of treating a subterranean formation, the method comprising:
placing in the subterranean formation a demulsifier composition comprising
an aqueous phase that is about 10 wt % to about 80 wt % of the demulsifier composition;
an oil phase that is about 10 wt % to about 80 wt % of the demulsifier composition, wherein the demulsifier composition comprises an emulsion comprising the aqueous phase and the oil phase;
a (C$_1$-C$_5$)alkyl alcohol that is about 5 wt % to about 30 wt % of the demulsifier composition;
an alkanolamide surfactant that is about 5 wt % to about 40 wt % of the demulsifier composition, wherein the alkanolamide surfactant has the structure:

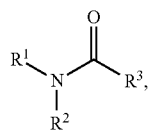

wherein R$^3$ is a substituted or unsubstituted (C$_{15}$-C$_{17}$) hydrocarbyl of a tall oil fatty acid having the structure R$^3$—C(O)—OH, and
R$^1$ and R$^2$ are each —CH$_2$—CH$_2$—OH;
an alkoxylated alcohol surfactant that is about 5 wt % to about 40 wt % of the demulsifier composition, wherein the alkoxylated alcohol surfactant is a (C$_{15}$)hydrocarbon comprising a secondary alcohol group, wherein the (C$_{15}$)hydrocarbon is otherwise unsubstituted, wherein the secondary alcohol group comprises a —(CH$_2$—CH$_2$—O)$_7$—H group thereon;
an amine-oxide surfactant that is about 0.01 wt % to about 20 wt % of the demulsifier composition, wherein the amine-oxide surfactant has the structure:

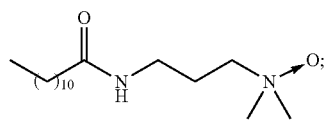

and
an amine-oxide surfactant that is about 0.01 wt % to about 20 wt % of the demulsifier composition, wherein the amine-oxide surfactant has the structure:

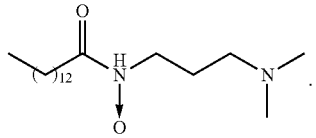

Embodiment 86 provides a method of treating produced petroleum comprising an emulsion, the method comprising:
contacting the produced petroleum comprising the emulsion with a demulsifier composition to reduce or eliminate the emulsion, the demulsifier composition comprising
an alkanolamide surfactant that is a (C$_1$-C$_{50}$)hydrocarbyl amide having groups R$^1$ and R$^2$ substituted on the amide nitrogen, wherein R$^1$ and R$^2$ are each independently selected from the group consisting of —H, —(C$_1$-C$_{50}$)hydrocarbyl, and —(C$_1$-C$_{50}$)hydrocarbylene-OH, wherein at least one of R$^1$ and R$^2$ is —(C$_1$-C$_{50}$)hydrocarbylene-OH;
an alkoxylated alcohol surfactant that is a (C$_1$-C$_{50}$)hydrocarbyl-OH having a —((C$_2$-C$_3$)alkylene-O)$_n$—H group on the —OH group, wherein n is about 1 to about 100; and
an amine-oxide surfactant;
wherein at each occurrence the (C$_1$-C$_{50}$)hydrocarbyl and (C$_1$-C$_{50}$)hydrocarbylene are substituted or unsubstituted and are independently selected.

Embodiment 87 provides a system comprising:
a tubular disposed in a subterranean formation; and
a pump configured to pump a demulsifier composition in the subterranean formation through the tubular, wherein the demulsifier composition comprises
an alkanolamide surfactant that is a (C$_1$-C$_{50}$)hydrocarbyl amide having groups R$^1$ and R$^2$ substituted on the amide nitrogen, wherein R$^1$ and R$^2$ are each independently selected from the group consisting of —H, —(C$_1$-C$_{50}$)hydrocarbyl, and —(C$_1$-C$_{50}$)hydrocarbylene-OH, wherein at least one of R$^1$ and R$^2$ is —(C$_1$-C$_{50}$)hydrocarbylene-OH;
an alkoxylated alcohol surfactant that is a (C$_1$-C$_{50}$)hydrocarbyl-OH having a —((C$_2$-C$_3$)alkylene-O)$_n$—H group on the —OH group, wherein n is about 1 to about 100; and
an amine-oxide surfactant;
wherein at each occurrence the (C$_1$-C$_{50}$)hydrocarbyl and (C$_1$-C$_{50}$)hydrocarbylene are substituted or unsubstituted and are independently selected.

Embodiment 88 provides a demulsifier composition comprising:
an alkanolamide surfactant that is a (C$_1$-C$_{50}$)hydrocarbyl amide having groups R$^1$ and R$^2$ substituted on the amide nitrogen, wherein R$^1$ and R$^2$ are each independently selected from the group consisting of —H, —(C$_1$-C$_{50}$)hydrocarbyl, and —(C$_1$-C$_{50}$)hydrocarbylene-OH, wherein at least one of R$^1$ and R$^2$ is —(C$_1$-C$_{50}$)hydrocarbylene-OH;
an alkoxylated alcohol surfactant that is a (C$_1$-C$_{50}$)hydrocarbyl-OH having a —((C$_2$-C$_3$)alkylene-O)$_n$—H group on the —OH group, wherein n is about 1 to about 100; and
an amine-oxide surfactant;
wherein at each occurrence the (C$_1$-C$_{50}$)hydrocarbyl and (C$_1$-C$_{50}$)hydrocarbylene are substituted or unsubstituted and are independently selected.

Embodiment 89 provides a demulsifier composition comprising:
an aqueous phase;
an oil phase, wherein the demulsifier composition comprises an emulsion comprising the aqueous phase and the oil phase;
an alkanolamide surfactant that has the structure:

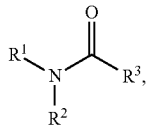

wherein $R^3$ is a substituted or unsubstituted $(C_{12}-C_{25})$ hydrocarbyl of a tall oil fatty acid having the structure $R^3$—C(O)—OH, and
$R^1$ and $R^2$ are each independently —$(C_1-C_{10})$alkylene-OH;
an alkoxylated alcohol surfactant that is a $(C_{10}-C_{20})$ hydrocarbon comprising a secondary alcohol group, wherein the $(C_{10}-C_{20})$hydrocarbon is otherwise unsubstituted, wherein the secondary alcohol group comprises a —$(CH_2$—$CH_2$—$O)_{5-10}$—H group thereon; and
an amine-oxide surfactant having the structure:

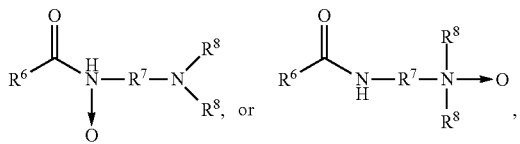

wherein
$R^6$ is $(C_{11}-C_{13})$alkyl,
$R^7$ is $(C_1-C_5)$alkylene, and
at each occurrence, $R^8$ is independently $(C_1-C_5)$alkyl.

Embodiment 90 provides a demulsifier composition comprising:
an aqueous phase that is about 10 wt % to about 80 wt % of the demulsifier composition;
an oil phase that is about 10 wt % to about 80 wt % of the demulsifier composition, wherein the demulsifier composition comprises an emulsion comprising the aqueous phase and the oil phase;
a $(C_1-C_5)$alkyl alcohol that is about 5 wt % to about 30 wt % of the demulsifier composition;
an alkanolamide surfactant that is about 5 wt % to about 40 wt % of the demulsifier composition, wherein the alkanolamide surfactant has the structure:

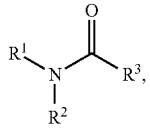

wherein $R^3$ is a substituted or unsubstituted $(C_{15}-C_{17})$ hydrocarbyl of a tall oil fatty acid having the structure $R^3$—C(O)—OH, and
$R^1$ and $R^2$ are each —$CH_2$—$CH_2$—OH;
an alkoxylated alcohol surfactant that is about 5 wt % to about 40 wt % of the demulsifier composition, wherein the alkoxylated alcohol surfactant is a $(C_{15})$hydrocarbon comprising a secondary alcohol group, wherein the $(C_{15})$hydrocarbon is otherwise unsubstituted, wherein the secondary alcohol group comprises a —$(CH_2$—$CH_2$—$O)_7$—H group thereon;
an amine-oxide surfactant that is about 0.01 wt % to about 20 wt % of the demulsifier composition, wherein the amine-oxide surfactant has the structure:

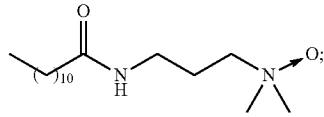

and
an amine-oxide surfactant that is about 0.01 wt % to about 20 wt % of the demulsifier composition, wherein the amine-oxide surfactant has the structure:

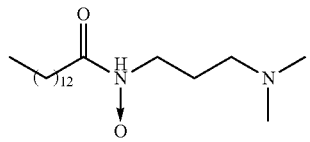

Embodiment 91 provides a method of preparing a demulsifier composition for treatment of a subterranean formation or of produced petroleum comprising an emulsion, the method comprising:
forming a demulsifier composition comprising
an alkanolamide surfactant that is a $(C_1-C_{50})$hydrocarbyl amide having groups $R^1$ and $R^2$ substituted on the amide nitrogen, wherein $R^1$ and $R^2$ are each independently selected from the group consisting of —H, —$(C_1-C_{50})$hydrocarbyl, and —$(C_1-C_{50})$hydrocarbylene-OH, wherein at least one of $R^1$ and $R^2$ is —$(C_1-C_{50})$hydrocarbylene-OH;
an alkoxylated alcohol surfactant that is a $(C_1-C_{50})$hydrocarbyl-OH having a —$((C_2-C_3)$alkylene-O$)_n$—H group on the —OH group, wherein n is about 1 to about 100; and
an amine-oxide surfactant;
wherein at each occurrence the $(C_1-C_{50})$hydrocarbyl and $(C_1-C_{50})$hydrocarbylene are substituted or unsubstituted and are independently selected.

Embodiment 92 provides the demulsifier composition, method, or system of any one or any combination of Embodiments 1-91 optionally configured such that all elements or options recited are available to use or select from.

What is claimed is:
1. A method of treating a subterranean formation, the method comprising:
placing in the subterranean formation a demulsifier composition comprising:
a microemulsion comprising an aqueous phase and an oil phase;
an alkanolamide surfactant that has the structure:

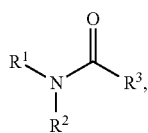

wherein $R^3$ is a substituted or unsubstituted ($C_{12}$-$C_{25}$)hydrocarbyl of a tall oil fatty acid having the structure $R^3$—C(O)—OH, and $R^1$ and $R^2$ are each independently —($C_1$-$C_{10}$)alkylene-OH;

an alkoxylated alcohol surfactant that is a ($C_{10}$-$C_{20}$) hydrocarbon comprising a secondary alcohol group, wherein the ($C_{10}$-$C_{20}$)hydrocarbon is otherwise unsubstituted, wherein the secondary alcohol group comprises a —(CH$_2$—CH$_2$—O)$_{5-10}$—H group thereon; and an amine-oxide surfactant having the structure:

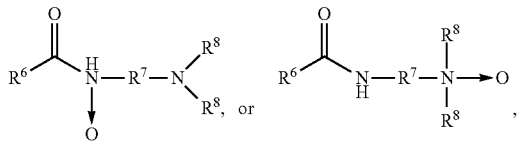

wherein $R^6$ is ($C_{11}$-$C_{13}$)alkyl, $R^7$ is ($C_1$-$C_5$)alkylene, and at each occurrence, $R^8$ is independently ($C_1$-$C_5$)alkyl.

2. The method of claim 1, wherein the method comprises hydraulically fracturing the subterranean formation with the demulsifier composition or with a subterranean treatment fluid comprising the demulsifier composition.

3. The method of claim 1, further comprising reducing or eliminating an emulsion in the subterranean formation, reducing or eliminating formation of an emulsion in the subterranean formation, or a combination thereof.

4. The method of claim 1, wherein the demulsifier composition further comprises an organic solvent.

5. The method of claim 1, wherein the alkanolamide surfactant has the structure:

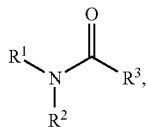

wherein $R^3$ is a substituted or unsubstituted ($C_{15}$-$C_{17}$) hydrocarbyl of a tall oil fatty acid having the structure $R^3$—C(O)—OH, and $R^1$ and $R^2$ are each —CH$_2$—CH$_2$—OH.

6. The method of claim 1, wherein the alkoxylated alcohol surfactant has the structure:

$R^4$—O—$R^5$, wherein $R^4$ is the ($C_{10}$-$C_{20}$)hydrocarbon, and $R^5$ is the —(CH$_2$—CH$_2$—O)$_{5-10}$—H group.

7. The method of claim 1, wherein the alkoxylated alcohol surfactant is a ($C_{15}$) hydrocarbon comprising a secondary alcohol group, wherein the ($C_{15}$)hydrocarbon is otherwise unsubstituted, wherein the secondary alcohol group comprises a —(CH$_2$—CH$_2$—O)$_7$—H group thereon.

8. The method of claim 1, wherein the amine-oxide surfactant has the structure:

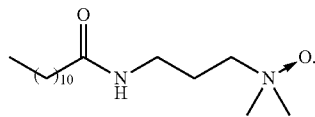

9. The method of claim 1, wherein the amine-oxide surfactant has the structure:

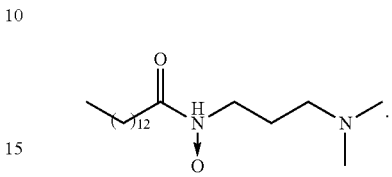

10. The method of claim 1, further comprising decreasing or eliminating a water-in-crude oil emulsion in the subterranean formation with the demulsifier composition.

11. The method of claim 1, wherein upon dilution in the subterranean formation the alkanolamide surfactant partitions into a crude oil phase present in the subterranean formation; and wherein the undiluted microemulsion is stable at high temperature between about 50° C. and about 300° C.

12. The method of claim 1, wherein the microemulsion comprises droplets of an inner phase having a size of 0.01 microns to about 0.15 microns, wherein at least one of the oil phase and the aqueous phase is the inner phase.

13. The method of claim 1, wherein the microemulsion is an oil-in-water microemulsion, wherein the aqueous phase is an outer phase of the oil-in-water microemulsion and wherein the oil phase is an inner phase of the oil-in-water microemulsion.

14. The method of claim 13, further comprising decreasing or eliminating a water-in-crude oil emulsion in the subterranean formation with the demulsifier composition.

15. The method of claim 14, wherein upon dilution in the subterranean formation the alkanolamide surfactant partitions into the crude oil phase, facilitating demulsification of the crude oil phase, and wherein the undiluted microemulsion is stable at a high temperature between about 50° C. and about 300° C.

16. The method of claim 15, wherein the microemulsion comprises droplets of the inner oil phase having a size of about 0.01 microns to about 0.15 microns.

17. The method of claim 1, wherein the microemulsion is stable at a high temperature between about 50° C. and about 300° C.

18. The method of claim 1, wherein the microemulsion is unstable when diluted to a concentration of about 0.2 wt % in water or brine.

19. The method of claim 1, wherein the microemulsion is stable in the presence of a total dissolved solids level of about 0 mg/L to about 250,000 mg/L.

20. The method of claim 1, wherein the microemulsion has a freezing point below about 10° C.

* * * * *